United States Patent
Smirin

(10) Patent No.: US 10,424,002 B2
(45) Date of Patent: Sep. 24, 2019

(54) SYSTEM AND METHOD FOR ORDERING A TRANSPORTATION VEHICLE USING A NEAR-FIELD COMMUNICATION DEVICE

(71) Applicant: GT Gettaxi Limited, Limassol H.E. (CY)

(72) Inventor: Shahar Smirin, Jerusalem (IL)

(73) Assignee: GT GetTaxi Limited, Limassol (CY)

( * ) Notice: Subject to any disclaimer, the term of this patent is extended or adjusted under 35 U.S.C. 154(b) by 616 days.

(21) Appl. No.: 14/554,074

(22) Filed: Nov. 26, 2014

(65) Prior Publication Data
US 2015/0149320 A1    May 28, 2015

Related U.S. Application Data

(60) Provisional application No. 61/909,226, filed on Nov. 26, 2013.

(51) Int. Cl.
| | |
|---|---|
| *G06Q 30/00* | (2012.01) |
| *G06Q 30/06* | (2012.01) |
| *H04W 4/04* | (2009.01) |
| *G06Q 20/14* | (2012.01) |
| *H04W 4/02* | (2018.01) |
| *H04W 4/80* | (2018.01) |

(52) U.S. Cl.
CPC ......... *G06Q 30/0633* (2013.01); *G06Q 20/14* (2013.01); *H04W 4/023* (2013.01); *H04W 4/046* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 7,817,990 B2 | 10/2010 | Pamminger et al. | |
| 8,666,840 B1* | 3/2014 | Matsas | G06Q 20/10 705/26.1 |
| 2009/0203367 A1* | 8/2009 | Pamminger | G06Q 30/00 455/414.3 |
| 2012/0064864 A1 | 3/2012 | Mizani | |
| 2013/0041776 A1* | 2/2013 | Schunemann | G06Q 30/02 705/26.41 |

(Continued)

FOREIGN PATENT DOCUMENTS

| | | |
|---|---|---|
| CN | 103325269 A | 9/2013 |
| RU | 103020 | 3/2011 |

(Continued)

OTHER PUBLICATIONS

Haroon Q. Raja, What is NFC, How It Works and What Are Its Practical Applications, May 14 2011, https://web.archive.org/web/20110710075144/http://www.addictivetips.com/hardware/what-is-nfc-how-it-works-what-are-its-practical-applications.*

(Continued)

*Primary Examiner* — Naeem U Haq
*Assistant Examiner* — Norman Donald Sutch, Jr.
(74) *Attorney, Agent, or Firm* — Lowenstein Sandler LLP

(57) ABSTRACT

Systems and methods for ordering a transportation vehicle using near-field communication (NFC) are disclosed. A method includes detecting that an NFC device of a client computing device is in physical proximity of a NFC target device. In response to the detecting, execution of a transportation application is initiated. Data is received from the NFC target device, and an order request is generated based on the transportation application and the received data.

15 Claims, 15 Drawing Sheets

(56) References Cited

U.S. PATENT DOCUMENTS

| | | | |
|---|---|---|---|
| 2013/0132140 A1* | 5/2013 | Amin | G06Q 10/02 705/7.13 |
| 2013/0288598 A1* | 10/2013 | Parkin | G06F 1/1626 455/41.1 |
| 2014/0019216 A1* | 1/2014 | Jo | G06Q 20/3278 705/13 |
| 2014/0052675 A1* | 2/2014 | Ko | G06N 5/02 706/12 |
| 2014/0070001 A1* | 3/2014 | Sanchez | G06Q 20/40 235/380 |
| 2014/0114856 A1* | 4/2014 | Jung | G06Q 20/3278 705/44 |
| 2015/0089005 A1* | 3/2015 | Brown | H04L 67/02 709/206 |
| 2015/0100439 A1* | 4/2015 | Lu | G06Q 10/087 705/15 |

FOREIGN PATENT DOCUMENTS

| | | |
|---|---|---|
| WO | 2010039337 | 4/2010 |
| WO | 2012027781 | 3/2012 |
| WO | 2013109322 | 7/2013 |

OTHER PUBLICATIONS

Knowledge@Wharton, An 'Uber' Problem for Cities: Balancing Innovation with Regulation, Nov. 20, 2012, http://knowledge.wharton.upenn.edu/article/anuberproblemforcitiesbalancinginnovationwithregulation/.*

Entertainment Close-Up; "VeriFone Releases Way2ride Mobile App for NYC Taxis"; Aug. 20, 2013; Close-Up Media, Inc.; p. 1 (Year : 2013).*

European Search Report for the European Patent Application No. 14194962.8, dated May 8, 2015, 7 pages.

* cited by examiner

SYSTEM AND METHOD FOR ORDERING A TRANSPORTATION VEHICLE USING A NEAR-FIELD COMMUNICATION DEVICE

CROSS-REFERENCE TO RELATED APPLICATION

This application claims the benefit of priority of U.S. Provisional Patent Application No. 61/909,226, filed Nov. 26, 2013, which is hereby incorporated by reference herein in its entirety.

TECHNICAL FIELD

This disclosure relates to transportation services and, in particular, to receiving and processing transportation order requests.

BACKGROUND

Transportation services, such as ridesharing and taxi services, often provide their services via smart phone application interfaces. The interfaces may allow users to request a pick-up by a driver of a transportation vehicle, cancellation of the request, and payment for the service. However, in many situations, requests and cancellations from multiple users at different, and sometimes inconvenient, locations lead to less than optimal dispatching of transportation vehicles to handle the requests.

BRIEF DESCRIPTION OF THE DRAWINGS

The disclosure is illustrated by way of example, and not by way of limitation, in the figures of the accompanying drawings, in which.

DETAILED DESCRIPTION

Figure 1:
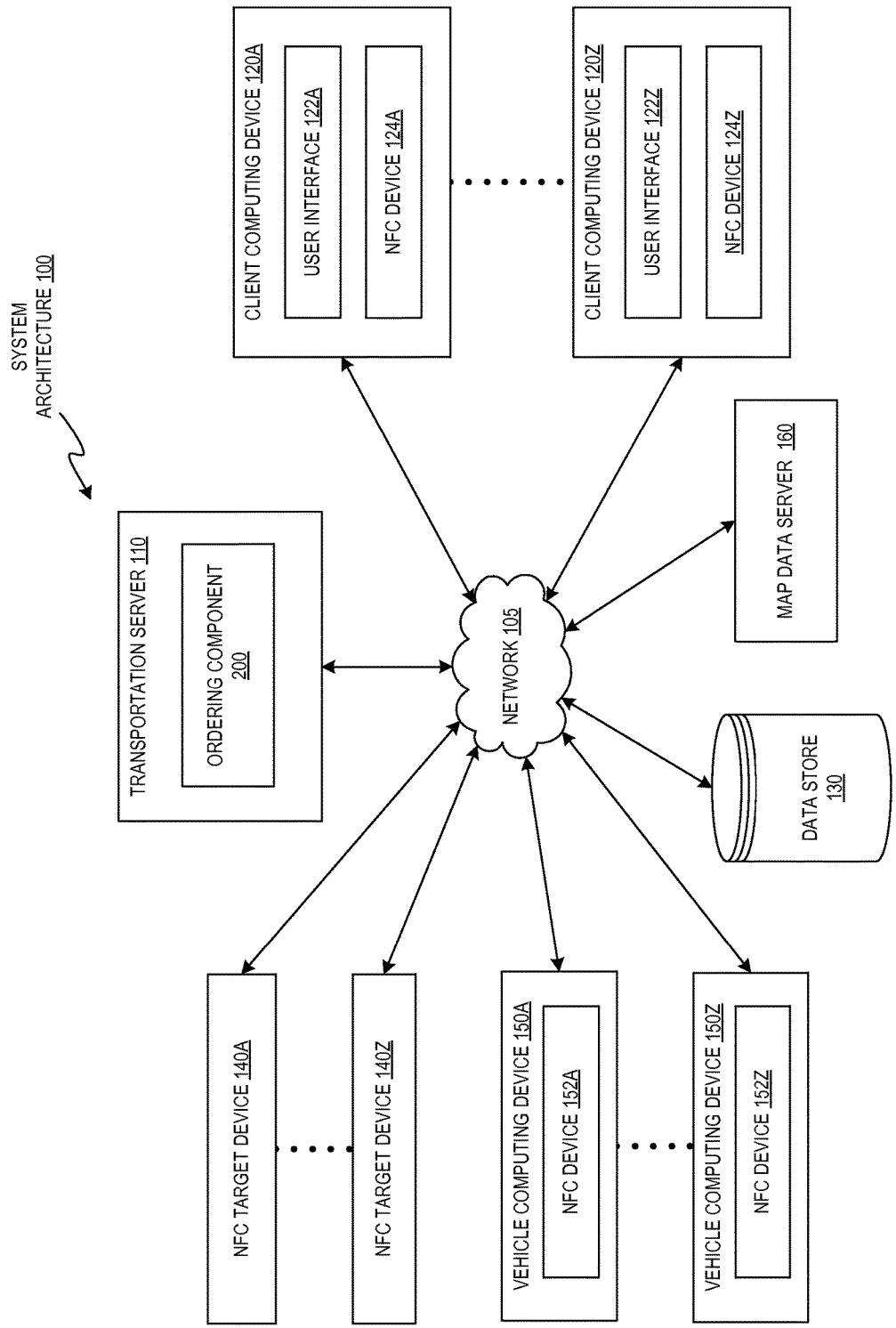
FIG. 1 illustrates an example system architecture in accordance with an implementation of the disclosure.

Described herein are systems and methods for ordering a transportation vehicle using near-field communication (NFC) devices. In one implementation, an NFC target device (e.g., an NFC device such as a radio-frequency identification (RFID) tag) may be provided in various geographical locations (e.g., mall entrances, airport terminals, movie theaters, restaurants, etc.). The NFC target device may be able to communicate with client computing devices (e.g., smartphones, cell phones, tablet computers, laptop computers, netbook computers, other computing devices, etc.) when an NFC device of a client computing device comes into physical proximity with the NFC target device. The client computing devices may utilize NFC devices (e.g., as built-in components or wirelessly coupled components) to interact with the NFC target device. Interaction between a client computing device and the NFC target device (e.g., detection of the NFC target device) may cause a transportation application that is on the client computing device to execute or resume execution so that the user may order a transportation vehicle.

In one implementation, the NFC target device may provide location information (e.g., global positioning system (GPS) coordinates, a street address, etc.) to the client computing device its NFC device. The transportation application may automatically communicate with a transportation server (e.g., one or computing devices and/or networks that manage, monitor, and communicate with transportation vehicles (e.g., taxis, shuttles, limousines, buses, etc.) to allocate and route transportation vehicles to different locations). For example, the transportation application may automatically provide the location information received from the NFC target device to the transportation server so that a transportation vehicle may be routed to the location of the NFC target device. In one implementation, the user may use the transportation application (that is initiated or resumed in response to detecting NFC target device) on the client computing device to order transportation vehicles.

In one implementation, the client computing device may obtain discounts or offers on goods or services from the NFC target device. For example, the NFC target device may include a coupon code that allows the user to receive free goods or services and/or a reduced price on goods or services. The client computing device may download and/or obtain the discounts and/or offers so that a user may use the discounts and/or offers at a later time. Different NFC target devices may include different discounts or offers.

In one implementation, the client computing device (via its NFC device) may also communicate with an NFC device in the transportation vehicle to provide payment for a ride or trip provided by the transportation vehicle. For example, the client computing device may communicate payment information (e.g., credit card information, account information, a payment amount, etc.) with to the NFC device located in the transportation vehicle.

In one implementation, the client computing device may also communicate with an NFC target device in order to obtain incentive points or units for an incentive program. The incentive program may allow a user to earn incentive points or units for each ride or trip ordered by the user. The user may be able to redeem the inventive points or units for discounts and/or free goods and services (e.g., can redeem points for a free drink, can redeem points for a free ride or trip, etc.).

In one aspect of the disclosure, a method includes detecting, by a processing device of a first client computing device, that a first NFC device of the first client computing device is in physical proximity of a first NFC target device. Execution of a transportation application is initiated in response to the detecting, and data is received from the first NFC target device. An order request is generated based on the transportation application and the received data.

In one implementation, the method further includes transmitting, by the processing device, the order request to a transportation server. In one implementation, the method further includes receiving a response from the transportation server indicating acceptance of the order request, and causing the client computing device to display a graphical representation of a relationship between a pick-up location and a location of the transportation vehicle.

In one implementation, the method further includes detecting that the first NFC device of the first client computing device is in physical proximity of a second NFC device of a second client computing device, and causing the order request to be associated with the second client computing device.

In one implementation, detecting the first NFC target comprises detecting that the first NFC target device is within one foot of the first NFC device. The first NFC target device may be a passive radio-frequency (RF) device that is capable of being powered by an RF transceiver of the first NFC device. In one implementation, receiving data from the first NFC target device includes receiving data from the first NFC target device in response to powering the first NFC target with the RF transceiver. In one implementation, the data includes one or more of location data, the transportation application, or coupon data.

In one implementation, the method further includes detecting that the first NFC device of the first client computing device is in physical proximity of a second NFC target device of a transportation vehicle, and transmitting payment information to the second NFC target device.

In one or more of the disclosed implementations, systems (e.g., systems including memories, processing devices, etc.) for performing operations of the aforementioned methods are also disclosed. Additionally, in implementations of the disclosure, a computer-readable storage medium (e.g., a non-transitory computer-readable storage medium) may encode operations for performing the aforementioned methods.

FIG. 1 illustrates an example system architecture 100, in accordance with an implementation of the disclosure. The system architecture 100 includes a transportation server 110, client computing devices 120A-120Z, a data store 130, NFC target devices 140A-140Z, vehicle computing devices 150A-150Z, and a map data server 160. The components 110-160 may be communicatively coupled/connected via a network 105. In one implementation, the network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In some implementations, the network 105 may be a combination of different types of networks.

In one implementation, the transportation server 110 and the map data server 160 may each correspond to one or more computing devices (e.g., a rackmount server, a router computer, a server computer, a personal computer, a mainframe computer, a laptop computer, a tablet computer, a desktop computer, etc.), data stores (e.g., hard disks, memories, databases), networks, software components, and/or hardware components. The transportation server 110 may utilize data received from the map data server 160 to manage, monitor, and communicate with vehicle computing devices 150A-150Z in order to allocate and route transportation vehicles to different locations. Specifically, the transportation server 110 may include an ordering component 200 (which may be executed by a processing device of the transportation server 110) that is capable of receiving orders from client computing devices 120A-120Z, transmitting order requests to the vehicle computing devices 150A-150Z, communicating with NFC target devices 140A-140Z, dispatching transportation vehicles (e.g., a taxis), and performing location tracking of the transportation vehicles. In some implementations, the ordering component 200 may process payments from users to pay for rides/trips, and/or may also award and track incentive points.

In some implementations, the ordering component 200 may be implemented on a different device than transportation server 110. For example, in some implementations, one or more of the NFC target devices 140A-140Z may implement the ordering component 200 (or at least some of the functionality of the ordering component 200). For example, NFC target device 140A may place an order via the network 105 in response to client computing device 120A being placed in close proximity of NFC target device 140A. In some implementations, one or more of the client computing devices 120A-120Z may implement the ordering component 200 (or at least some of the functionality of the ordering component 200). In some implementations, some or all of the functionality of the ordering component 200 may be distributed across one or more of the NFC target devices 140A-140Z, one or more of the client computing devices 120A-120Z, and/or one or more of the vehicle computing devices 150A-150Z. In some implementations, the transportation server 110 may be omitted from the system architecture 100. In some implementations, more than one transportation server 110 may be included in the system architecture 100.

In one implementation, the map data server 160 includes map data for a variety of locations (e.g., city maps), as well as real-time traffic conditions, detours (e.g., due to construction), etc. The map data server 160 may provide map data to one or more devices within the system architecture 100 via the network 105. In some implementations, the transportation server 110 may receive map data from the map data server 160, which may be used by the ordering component 200 to compute an estimated time of arrival (ETA) for a transportation vehicle to arrive at a pick-up location (e.g., a location of or in relation to one of the NFC target devices 140A-140Z).

In one implementation, the data store 130 may be a memory (e.g., random access memory), a cache, a drive (e.g., a hard drive), a flash drive, a database system, or another type of component or device capable of storing data. The data store 130 may also include multiple storage components (e.g., multiple drives or multiple databases) that may also span multiple computing devices (e.g., multiple server computers), and may be cloud-based. In some implementations, the data store 130 may be a part of the transportation server 110. In some implementations, the data store 130 may be distributed among and accessible to the transportation server 110, one or more of the client computing devices 120A-120Z, one or more of the NFC target devices 140A-140Z, one or more of the vehicle computing devices 150A-150Z, and/or the map data server 160. One or more of the devices of the system architecture 100 may utilize the data store 130 to store public and private data. The data store 130 may be configured to provide secure storage for private data.

In one implementation, the client computing devices 120A-120Z may include computing devices such as personal computers (PCs), laptops, mobile phones, smart phones, tablet computers, netbook computers, etc. The client computing devices 120A-120Z may also be referred to as "user devices". An individual user may be associated with (e.g., own and/or use) one or more of the client computing devices 120A-120Z, and the client computing devices 120A-120Z may each be owned and utilized by different users at different locations. As used herein, a "user" may refer generally to an individual operator of one or more of the client computing devices 120A-120Z and/or one or more of the NFC target devices 140A-140Z, as well as one or more of the vehicle computing devices 150A-150Z (e.g., a driver of a transportation vehicle).

In one implementation, the client computing devices 120A-120Z may each implement one of user interfaces 122A-122Z, respectively. Each of user interfaces 122A-122Z may allow a user of the respective client computing device 120A-120Z to send/receive information to/from the transportation server 110, any of NFC target devices 140A-140Z, the data store 130, any of the vehicle computing devices 150A-150Z, and the map data server 160. For example, one or more of the user interfaces 122A-122Z may be a web browser interface that can access, retrieve, present, and/or navigate content (e.g., web pages such as Hyper Text Markup Language (HTML) pages) provided by the transportation server 110. In one implementation, one or more of the user interfaces 122A-122Z may be a standalone transportation application (e.g., a mobile app), which may have been provided by the transportation server 110 (e.g., as a downloadable application to be installed by an administrator) or by one of NFC target devices 140A-140Z. The user interfaces 122A-122Z may allow for the client computing device 120A-120Z to send/receive information to/from the transportation server 110 and/or one or more of the NFC target devices 140A-140Z. In some implementations, one or more of the client computing devices 120A-120Z may be associated with an account number that identifies the client computing devices 120A-120Z to the transportation server 110. In some implementations, the user interfaces 122A-122Z may allow their respective client computing devices 120A-120Z to interact directly with the transportation server 110 without interacting with one or more of the NFC target devices 140A-140Z. In some implementations, a user interface 122A-122Z (e.g., implemented as a transportation application) may be initiated on a respective client computing device 120A-120Z in response to the respective client computing device 120A-120Z being placed in proximity of one of the NFC target devices 140A-140Z, as is discussed in greater detail below.

In some implementations, in addition to allowing users of client computing devices 120A-120Z to place order requests, the transportation application may also allow a user to pay for a ride or a trip, monitor the locations of different transportation vehicles, select a transportation vehicle, provide feedback on drivers and/or transportation vehicles (e.g., rate a driver), etc. The transportation application may also provide a variety of information to the user such as, but not limited to, estimated time of arrival (ETA) of the transportation vehicle, information about the driver of the transportation vehicle (such as driver name/phone number), information about the transportation vehicle (e.g., type of vehicle, make, model, year, etc.), updates about whether a driver will late or has arrived and is waiting, and whether a ride has been completed (e.g., whether the transportation vehicle has arrived at the pick-up location specified by the user). The user interfaces 122A-122Z and their functionality are described in greater detail with respect to FIGS. 6-9.

In one implementation, the client computing devices 120A-120Z may each implement one of NFC devices 124A-124Z, respectively. The NFC devices 124A-124Z may be devices that are capable of communicating with other devices using NFC protocols or standards. NFC protocols or standards allow for two devices to establish radio communication with each other by placing the devices in physical proximity with each other. The physical proximity may range up to a few centimeters (e.g., up to 10 cm), a few inches (e.g., up to 12 inches), or a few feet (e.g., up to 5 feet). NFC protocols and/or standards may include, for example, the Android™ Beam standard which allows data exchange between two computing devices (e.g., two devices that use the Android™ operating system). When an initiating device (e.g., one of the client computing devices implementing a respective NFC device 124A-124Z) comes in close enough proximity to a receiving device (e.g., one of the client computing devices implementing a respective NFC device 124A-124Z, or one the NFC target devices 140A-140Z), the initiating device may present for display a user interface that facilitations data exchange between the devices.

In some implementations, one or more of the NFC devices 124A-124Z may be built into their respective client computing devices 120A-120Z. For example, NFC device 124A may be built into client computing device 120A (which may be computing device such as a personal computer (PC), a laptop computer, a mobile phone, a smart phone, a cellular phone, a personal digital assistant (PDA), a tablet computer, a netbook computer, etc.). In other implementations, one or more of the NFC devices 124A-124Z may be separate from their respective client computing devices 120A-120Z. For example, the NFC device 124A may be a smartwatch device (e.g., a computing device that is wearable on a wrist or arm of the user and is capable of communication via NFC protocols or standards). The smartwatch may be coupled to another computing device (e.g., a smartphone) via a wired or wireless connection (e.g., via BlueTooth, via 802.11 protocols, etc.). It is to be understood that the phrase "an NFC device of a client computing device", as used herein, may refer to a client computing device having a built in NFC device or a client computing device communicatively coupled to a separate NFC device (e.g., by a wired or wireless connection).

In one implementation, the NFC target devices 140A-140Z may each be provided or installed (e.g., as a sticker that is attached to a surface, as computing device, etc.) at fixed geographical locations (e.g., in a restaurant, a mall entrance, a movie theater, etc.). NFC target devices 140A-140Z may also be installed on table tops (e.g., on the surface of a table at a restaurant, bar, etc.), on posters/billboards (e.g., included on a "smart poster"), or included as part of a display, stand, or other physical structure. In some implementations, one or more of the NFC target devices 140A-140Z may include power sources (e.g., a battery or power supply coupled to a power outlet), which allow the NFC target devices 140A-140Z to communicate without utilizing the RF field and/or magnetic field generated by other devices (e.g., NFC devices 124A-124Z). In some implementations, the NFC target devices 140A-140Z may be included in any location or on any surface.

In some implementations, one or more of the NFC target devices 140A-140Z are passive devices (e.g., are not connected to a power source), and may be powered by a generated RF field and/or a magnetic field of an NFC device 124A-124Z that comes within physical proximity. Such passive devices may be provided in various forms, such as tags, stickers, key fobs, labels, etc., and may contain read-only data, rewriteable data, and combinations thereof. For example, a manufacturer or distributor of the one or more passive NFC target devices 140A-140Z may be able to write and/or modify the data of the devices using various hardware and/or software components.

In some implementations, one or more of the NFC target devices 140A-140Z may include storage (e.g., memory, cache, etc.) that is used to store the data locally. For example, one or more of the NFC target devices 140A-140Z may locally store order data location data, identifiers of specific transportation vehicles, and, map data of the surrounding area. In some implementations, the NFC target devices 140A-140Z may transmit data stored in their respective storages to the transportation server 110, and may also update the data stored in their respective storages based on data received from the transportation server 110, the vehicle computing devices 150A-150Z, and/or the map data server 160.

In one implementation, one or more of the NFC target devices may be kiosks that are capable of near-field communication with NFC devices 124A-124Z. The kiosks may facilitate order request generation and transmission on behalf of a user, and may be operated by the user. In some implementations, the user may use his/her client computing device to provide order request data, which is transmitted to the kiosk the client computing device is in physical proximity of the kiosk (e.g., within 10 feet). The kiosk may then use the order request data to place the order request.

In other implementations, one or more of the NFC target devices 140A-140Z may be replaced with a scannable code that can be read by the client computing devices 120A-120Z. For example, a scannable code (e.g., a quick response code) may, upon being read by client computing device 120A, initiate execution of a transportation application by client computing device 120A. The scannable code may also encode geographic location corresponding to the location at which the code was scanned or a nearby pick-up location, which may be utilized by the transportation application in ordering a transportation vehicle.

In one implementation, one or more of the NFC target devices 140A-140Z may include/encode instructions and/or data that, when one of the client computing devices 120A-120Z is in physical proximity, initiate execution or resume execution of a transportation application on the respective client computing device 120A-120Z. An example of the instructions and/or data that may be of the NFC target devices 140A-140Z may be an Android™ Application Record (AAR). For example, if the client computing devices 120A (e.g., an Android™ device) receives an AAR when in physical proximity of one of the NFC target device 140A, the client computing device 120A may initiate or resume execution of an application (e.g., a transportation application) based on a package name identified by the AAR. In one implementation, if the application specified by the package name identified by the AAR is not installed on the client computing device 120A, the client computing device 120A may automatically download the transportation application from a server (e.g., the transportation server 110) via the network 120. For example, the client computing device 120A may automatically download the transportation application from an application store or application service (e.g., a service that provides application to users). The client computing device 120A may also prompt a user to download the application from the server instead of automatically downloading the application. In one implementation, the transportation application may be transmitted from the NFC target device 140A to the client computing device 120A over the network 120 or via near-field communication.

In one implementation, the instructions and/or data from one or more of the NFC target devices 140A-140Z may cause a transportation application of a respective client computing device 120A-120Z to complete a previously-initiated order request. For example, the user may have previously used the client computing device 120A to initiate an order request with the transportation server 110 (e.g., by providing a phone number). The client computing device 120A may then determine a pick-up location (e.g., using GPS coordinates) after detecting the NFC target device 140A, which then completes the order request by transmitting the pick-up location information to the transportation server 110.

In one implementation, the transportation application may automatically order or request a transportation vehicle when a client computing device 120A-120Z receives the instructions and/or data from an NFC target device 140A-140Z. For example, the client computing device 120A may receive instructions to order a transportation vehicle for a user and/or may receive GPS coordinates from the NFC target device 140A (e.g., to serve as a pick-up location). The transportation application may automatically communicate with the transportation server 110 via the network 105 to order or request a transportation vehicle for the user. The transportation server 110 may then provide GPS coordinates of the NFC target device 140A to one or more of vehicle computing devices 150A-150Z.

In some implementations, the instructions and/or data of the one or more NFC target devices 140A-140Z may allow an order request to be placed automatically without the use of a transportation application (e.g., a user of one of client computing devices 120A-120Z need not manually provide a location and select a transportation vehicle). For example, in some implementations, one or more of the NFC target devices 140A-140Z may communicate with the transportation server 110 via the network 105.

In one implementation, client computing devices 120A-120Z may obtain discounts or offers on goods or services from one or more of the NFC target devices 140A-140Z. For example, the NFC target devices 140A-140Z may include data such as coupon codes that allow a user to receive free goods or services and/or reduced prices on goods or services. The client computing devices 120A-120Z may download and/or obtain the discounts and/or offers, which may be stored locally for future redemption. For example, the client computing device 120A may download, in response to establishing near-field communication with the NFC target device 140A, a coupon for a restaurant so that the user may receive a discount in his/her bill when the user visits the restaurant.

In one implementation, the NFC target devices 140A-140Z may include data and/or information pertaining to advertisements of services and/or goods. For example, the NFC target device 140A may include data indicating products and/or promotions on products that are sold by a vendor, such as those presented in a weekly advertisement or flyer. The client computing device 120A may receive such information in response to interacting with the NFC target device 140A.

In one implementation, client computing devices 120A-120Z may communicate with NFC target devices 140A-140Z in order to obtain incentive points or units for an incentive program associated with transportation services. The incentive program may allow a user to earn incentive points or units for each ride or trip ordered by the user. For example, the transportation server 110 may be associated with a particular company. As the user orders transportation vehicles using the transportation server 110 (e.g., using the company), the user may earn incentive points for each transportation vehicle ordered and/or used. A user of one of client computing devices 120A-120Z may be awarded these incentive points when communication (e.g., near-field communication) is established between one of the NFC target devices 140A-140Z or one of the vehicle computing devices 150A-150Z. The user may be able to redeem the inventive points or units for discounts and/or free goods and services. For example, the user may redeem the incentive points for reduced prices when transmitting an order request at a later time, or the user may redeem the incentive points for free merchandise (e.g., a free book, a free shirt, etc.). In some implementations, transportation vehicles may be for personal purposes or business/corporate purposes, and incentive points may be usable for respective personal incentive programs or business/corporate incentive programs depending on how the transportation vehicle is used.

In one implementation, the transportation server 110 and/or other servers may monitor the different NFC target devices 140A-140Z that one or more of the client computing devices 120A-120Z communicates and/or comes into physical proximity with. For example, for a user of client computing device 120A, a server may monitor the times, locations, dates, duration, etc., that the client computing device 120A comes into proximity with the various NFC target devices 140A-140Z. The client computing device 120A may store this information and then transmit this information to a server (e.g., the transportation server 110). The server may use this information to compute statistical information (e.g., the number of times a user has interacted with a particular NFC target device 140A-140Z) and to learn the behavior of the user (e.g., when the user tends to visit certain NFC target devices 140A-140Z).

In some implementations, near-field communication may occur between client computing devices 120A-120Z via their respective NFC devices 124A-124Z. In some implementations, near-field communication may occur between any of client computing devices 120A-120Z and NFC target devices 140A-140Z. In some implementations, near-field communication may occur between NFC target devices 140A-140Z.

In one implementation, the vehicle computing devices 150A-150Z may be computing devices (e.g., "driver boxes") that are located on-board transportation vehicles (e.g., as built-in computing devices or separate/portable devices operated by drivers of the transportation vehicles). The vehicle computing devices 150A-150Z may include computing devices such as personal computers (PCs), laptops, mobile phones, smart phones, tablet computers, netbook computers, etc. The vehicle computing devices 150A-150Z may have some or all of the functionality of each of the client computing devices 120A-120Z, and may be configured to exchange data with each other as well as with the transportation server 110, the client computing devices 120A-120Z, the data store 130, the NFC target devices 140A-140Z, and the map data server 160. The vehicle computing devices 150A-150Z may be located aboard any suitable transportation vehicle, such as a taxi, a car, a truck, a van, a limousine, a sport utility vehicle, etc., that may be used to transport users between locations.

A driver operating one of vehicle computing devices 150A-150Z may receive order requests, accept order requests, decline order requests, and/or transfer order requests to other drivers (e.g., other drivers operating vehicle computing devices 150A-150Z). In one implementation, the vehicle computing devices 150A-150Z may include GPS tracking devices for tracking locations of their respective transportation vehicles. Location data generated by the GPS tracking devices may be transmitted to the transportation server 110 and utilized, for example, to compute estimate times of arrival. The vehicle computing devices 150A-150Z may also include respective NFC devices 152A-152Z, which may be used to establish near-field communication between any of client computing devices 120A-120Z via their respective NFC devices 124A-124Z. In some implementations, one or more of the NFC devices 152A-152Z may function as transceivers (e.g., similar to NFC devices 124A-124Z). In some implementations, one or more of the NFC devices 152A-152Z may be passive NFC devices (as described with respect to certain implementations of NFC target devices 140A-140Z).

In one implementation, client computing devices 120A-120Z may establish near-field communication between their respective NFC devices 124A-124Z and respective NFC devices 152A-152Z of the vehicle computing devices 150A-150Z in order to provide payment for a ride or trip. For example, the client computing device may communicate payment information (e.g., credit card information, account information, a payment amount, etc.) with the vehicle computing device 150A located in a transportation vehicle.

In one implementation, the transportation server may include a database (e.g., stored in the data store 130) that includes pick-up locations (e.g., designated locations for picking up a passenger) associated with one or more of the NFC target devices 140A-140Z. For example, when the transportation server 110 receives an order request (e.g., from client computing device 120A) for a transportation vehicle, the transportation server 110 may determine a pick-up location based on an identifier (e.g., a serial number, an alpha-numeric identifier, a numeric identifier, etc.) included in the order request, with the identifier corresponding to an NFC target device (e.g., NFC target device 140A) detected by the client computing device 120A. Each of the NFC target devices 140A-140Z may have associated identifiers such as unique serial numbers. The determined pick-up location associated with the NFC target device 140A may be automatically-transmitted to one or more vehicle computing devices 150A-150Z of transportation vehicles.

In some implementations, a pick-up location may correspond to an address associated with an NFC target device or geographical location (e.g., the physical location) of the NFC target device. In some implementations, one or more of the NFC target devices 140A-140Z may include global positioning system (GPS) tracking devices, which can determine locations of the NFC target devices 140A-140Z. In some implementations, one or more of the NFC target devices 140A-140Z may be portable, and location information may be transmitted directly to the transportation server 110 from the one or more NFC target devices 140A-140Z upon arriving at a new location, or may be first communicated to a client computing device 120A-120Z which then transmits the location information in the form of the order request. In some implementations, one or more of the NFC target devices 140A-140Z may be associated with two or more pick-up locations, and a user of one of the client computing devices 120A-120Z may select a desired pick-up location from the available pick-up locations (e.g., using a respective user interface 122A-122Z).

Figure 2:
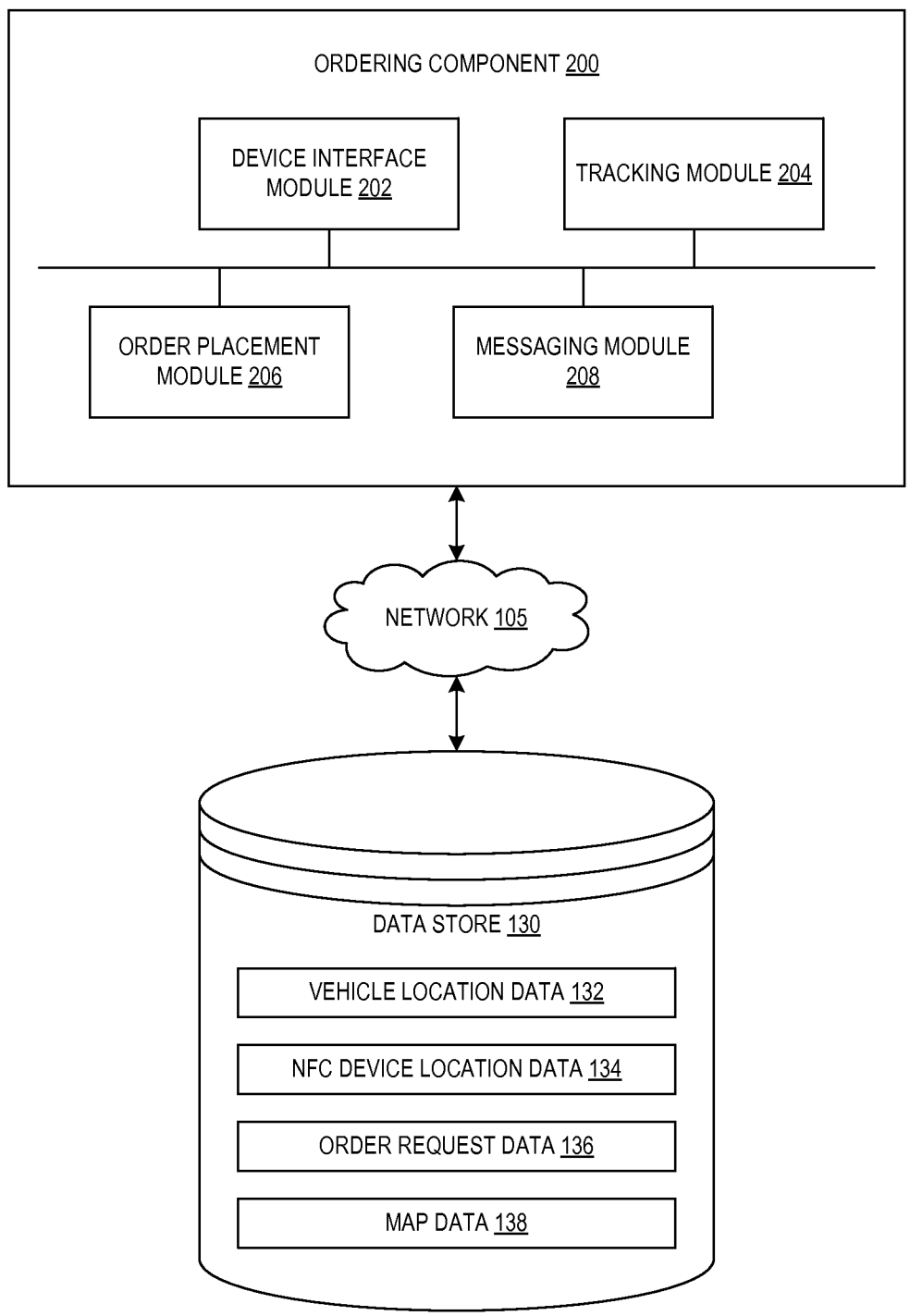
FIG. 2 is a block diagram illustrating features of an ordering component according to an implementation of the disclosure.

FIG. 2 is a block diagram illustrating features of an ordering component 200 in accordance with an implementation of the disclosure. The ordering component 200 may be the same as its identically named counterpart of FIG. 1. In one implementation, the ordering component 200 includes a device interface module 202, a tracking module 204, an order placement module 206, and a messaging module 208. More or less components may be included in the ordering component 200 without loss of generality. For example, two or more of the modules may be combined into a single module, or one of the modules may be divided into two or more modules.

In one implementation, one or more of the modules may reside on different computing devices. For illustrative purposes, the ordering component 200 is described as being implemented by the transportation server 110, but it may be implemented at least partially by any of the client computing devices 120A-120Z, the NFC target devices 140A-140Z, any of the vehicle computing devices 150A-150Z, and/or the map data server 160. For example, an NFC target device (e.g., NFC target device 140A) may be programmed to perform some or all of the functions of the ordering component 200. When the ordering component 200 is implemented on a device other than the transportation server 110, any functions described with respect to the ordering component 200 that "receive", "transmit", "generate", "detect", "retrieve", "identify", "determine", "select", etc., are understood to refer to functions performed by sub-systems or sub-modules within the implementing device rather than across a network (e.g., the network 105), as would be appreciated by one of ordinary skill in the art.

In one implementation, the device interface module 202 is utilized by the ordering component 200 to exchange data between one or more devices (e.g., one or more devices of the system architecture 100). In one implementation, the device interface module 202 may exchange message data between transportation vehicles (e.g., between vehicle computing devices 150A-150Z), and may store vehicle location data 132 in the data store 130. In one implementation, the device interface module 202 may maintain NFC device location data 134 (e.g., location data of the NFC target devices 140A-140Z), and update the NFC device location data 134 to include newly-added NFC target devices and updated locations for current NFC target devices. In one implementation, the device interface module 202 may process order request data 136 received from client computing devices (e.g., the client computing devices 120A-120Z) or NFC target devices (e.g., the NFC target devices 140A-140Z), which may be stored in the data store 130. In one implementation, the device interface module 202 may receive and store map data 138 (which may be received from the map data server 160).

In one implementation, the tracking module 204 is utilized by the ordering component 200 to track the locations of transportation vehicles (e.g., based on location data received from the vehicle computing devices 150A-150Z). In one implementation, in response to the device interface module 202 receiving an order request, the tracking module 204 may identify the closest vehicles to the location NFC target device where the order was placed (or a designated pick-up location) within a pre-defined range (e.g., a 1 mile radius, a 5 mile radius, etc.). The pre-defined range may be configured by an administrator of a system of the ordering component 200.

In one implementation, the tracking module 204 may receive updated location data periodically from each of the plurality of vehicle computing devices 150A-150Z, which may be used to determine current location, driving direction, and estimated time of arrival at a designated pick-up location. In one implementation, an estimated time of arrival for a transportation vehicle may be computed based on any of the current location of the transportation vehicle, a current speed of the transportation vehicle, an average speed of the transportation vehicle, an optimized route for traveling from the current location to a pick-up location, speed limits along the optimized route, or current traffic conditions.

In one implementation, the order placement module 206 may be utilized by the ordering component 200 to transmit order requests to one or more of the vehicle computing devices 150A-150Z of transportation vehicles. In one implementation, the order placement module 206 may transmit an order request to one or more of the vehicle computing devices 150A-150Z within a pre-defined range of client computing device or NFC target device from which the order request was received. In one implementation, the order placement module 206 may transmit the order request to one or more of the vehicle computing devices corresponding to one or more user-selected transportation vehicles (e.g., using one of the user interfaces 122A-122Z). For example, the user may prefer a particular make/model of transportation vehicle or a particular driver, and may make indicate the preference when placing the order request.

In one implementation, a user may be assigned a transportation vehicle in response to receiving a response from a vehicle computing device of the transportation vehicle indicating acceptance of the order request. After assigning the transportation vehicle, location information associated with the transportation vehicle may be transmitted periodically (e.g., from the transportation server 110) to the client computing device of the user.

In one implementation, the messaging module 208 may be utilized by the ordering component 200 to transmit order-related updates to one or more of the client computing devices 120A-120Z. The messages may include any type of electronic communication messages, such as short message service (SMS) messages, e-mails, text messages, etc. to a client computing device of the user that placed an order request.

Figure 3:
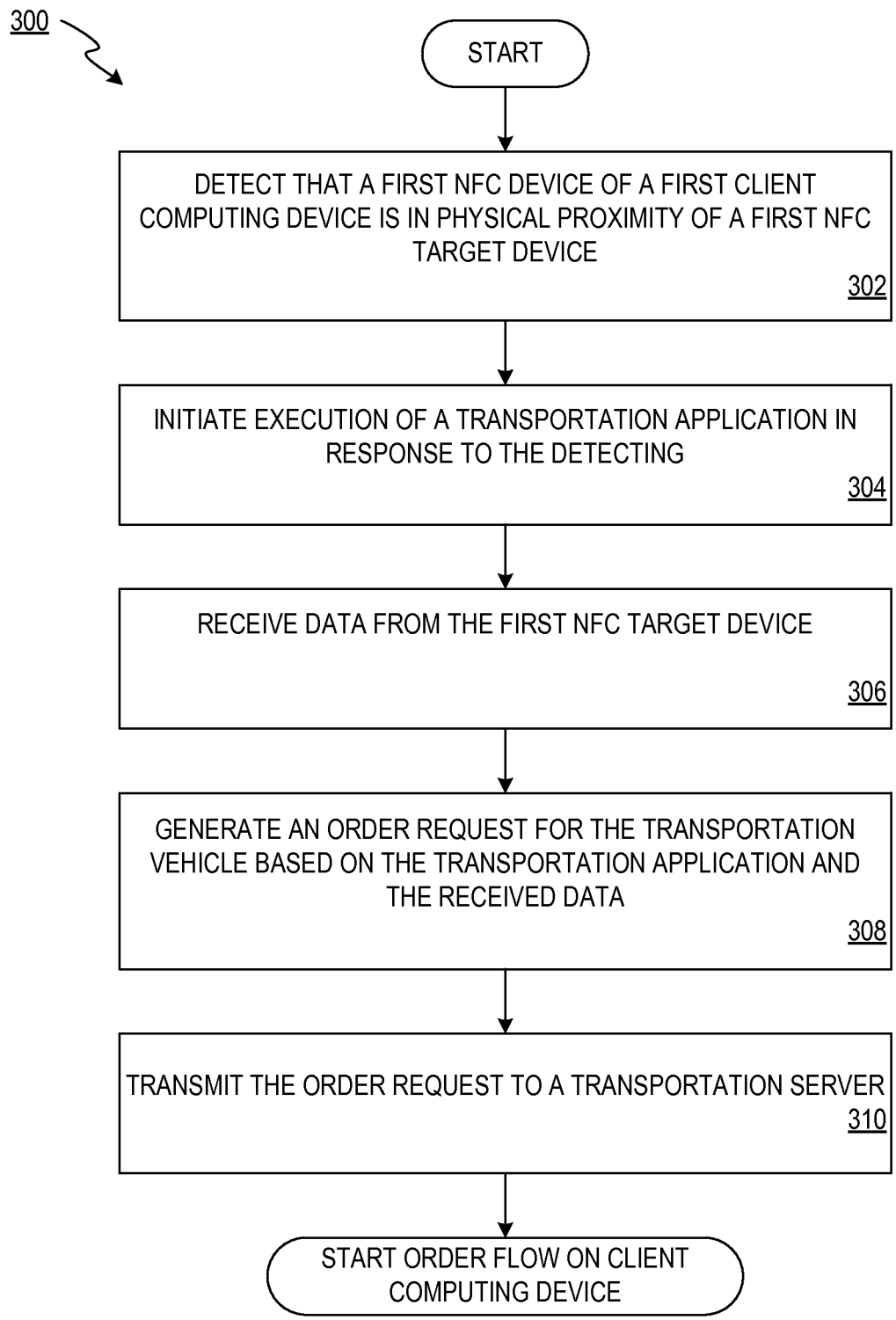
FIG. 3 is a flow diagram illustrating a method for ordering a transportation vehicle according to an implementation of the disclosure.

FIG. 3 is a flow diagram illustrating a method 300 for ordering a transportation vehicle according to an implementation of the disclosure. The method 300 may be performed by processing logic that includes hardware (e.g., circuitry, dedicated logic, programmable logic, microcode, etc.), software (e.g., instructions run on a processing device to perform hardware simulation), or a combination thereof. In one implementation, the method 300 may be performed by a processing device of one of the client computing devices 120A-120Z. In other implementations, other devices may perform method 300 (e.g., one or more devices of the system architecture 100).

Referring to FIG. 3, the method 300 begins at block 302 where a processing device detects that a first NFC device (e.g., NFC device 124A) of a first client computing device (e.g., client computing device 120A) is in physical proximity of a first NFC target device (e.g., NFC target device 140A). In one implementation, the first NFC device may emit a signal (e.g., an RF field or a magnetic field) that interacts with the first NFC target device when the first NFC device and the first NFC target device are within a physical distance of each other (e.g., within an inch, within a foot, within 5 feet, within 10 feet, etc.). The processing device may detect the first NFC target device by receiving a response signal from the first NFC target device. In one implementation, the first NFC target device is a passive radio-frequency (RF) device that is capable of being powered by the first NFC device (e.g., by an RF transceiver of the first NFC device). In some implementations, the processing device may detect that the first NFC device is in physical proximity of the first NFC target device by receiving a signal emitted by the NFC target device.

Figure 4:
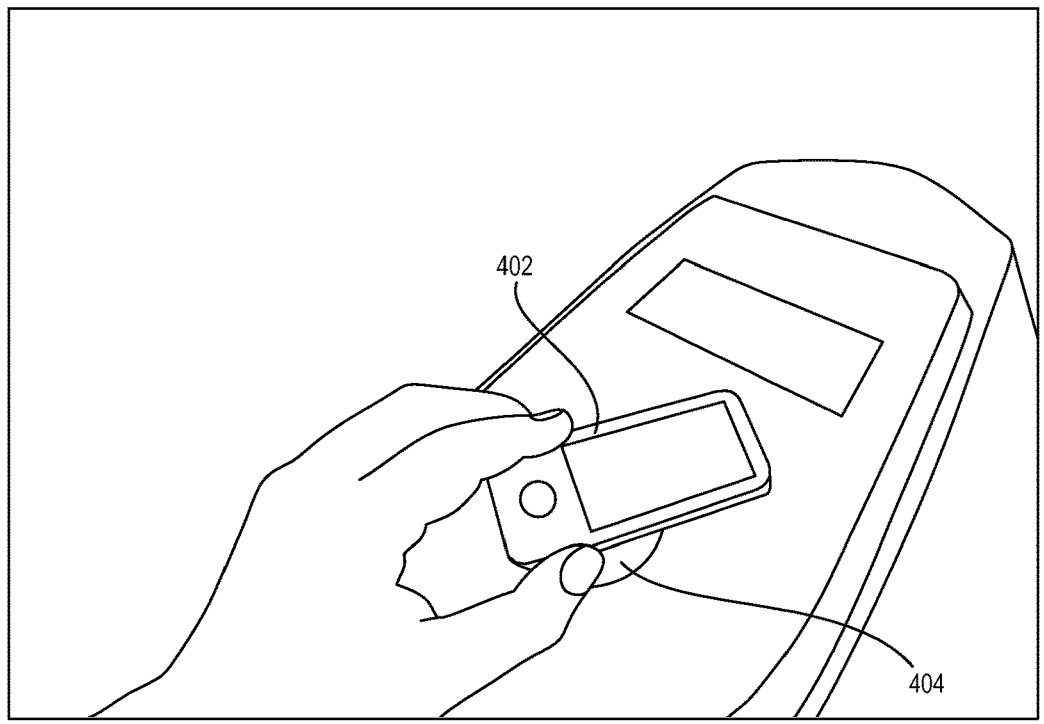
FIG. 4 illustrates an exemplary client computing device being placed in physical proximity of an exemplary near-field communication target device according to an implementation of the disclosure.
Figure 5:
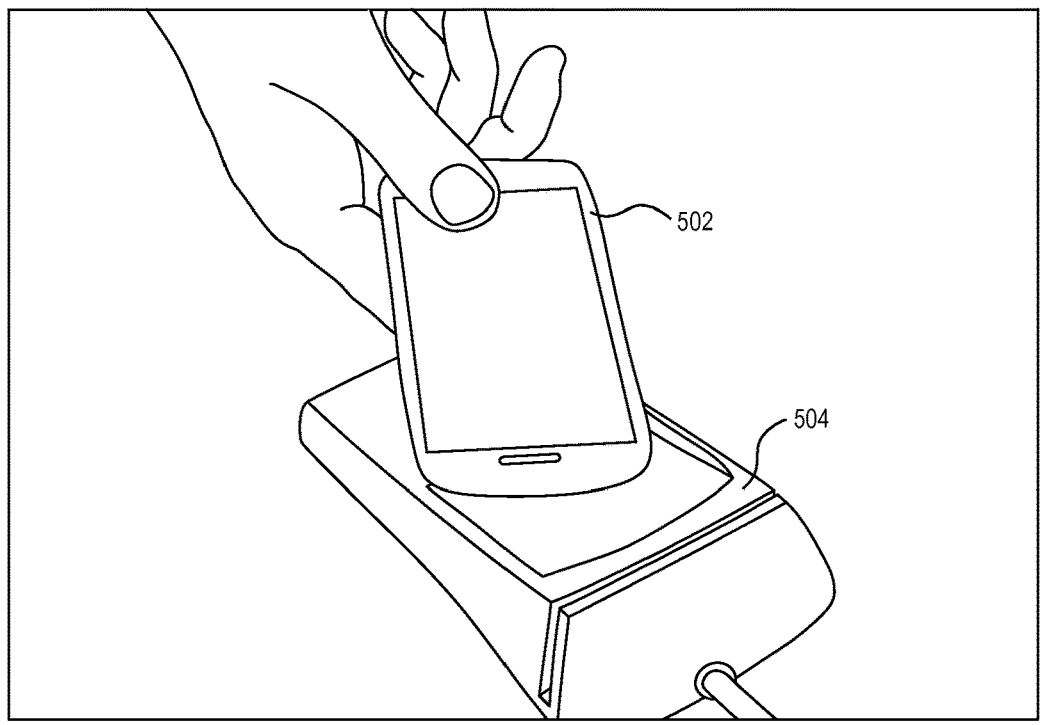
FIG. 5 illustrates an exemplary client computing device being placed in physical proximity of an exemplary near-field communication target device according to another implementation of the disclosure.

Reference is now made to FIGS. 4 and 5, which illustrate exemplary client computing devices being placed in physical proximity of exemplary NFC target devices according to an implementation of the disclosure. The client computing devices 402, 502 are illustrated as being smartphones. The NFC target device 404 is illustrated as being built into a stand, display, or kiosk. The NFC target device 504 is illustrated as being as being built into a vehicle computing device of a transportation vehicle (e.g., which may be used to process payments). It is noted that the implementations depicted in FIGS. 4 and 5 are illustrative, and any suitable client computing devices and NFC target devices may be utilized in accordance with the methods described herein.

Referring again to FIG. 3, at block 304, execution of a transportation application (e.g., using user interface 122A) is initiated or resumed in response to the detecting described with respect to block 302. An exemplary user interface for the transportation application is described in detail with respect to FIGS. 4-9.

At block 306, data is received from the first NFC target device. In some implementations, the data includes, but is not limited to, one or more of location data, the transportation application (which may be downloaded by or transmitted to the client computing device if it is not installed on the client computing device), coupon data, a list of available vehicles that service the NFC target device, etc. In some implementations, if the first NFC target device is a passive device, the data may be received from the first NFC target device in response to powering the first NFC target with an RF transceiver of the first NFC device of the first client computing device.

At block 308, an order request is generated for the transportation vehicle based on the transportation application and the received data. In some implementations, some of the information received from the first NFC target device is utilized by the transportation application to generate the order request (e.g., pick-up location information, redemption codes, etc.). In one implementation, the user may select a transportation vehicle from a list of transportation vehicles. In another implementation, the user may not be able to select a particular vehicle and a transportation vehicle may be selected automatically (e.g., by the transportation server 110). In some implementations, the user may select a pick-up location from one or more available pick-up locations (e.g., associated with the first NFC target device), or the pick-up location may be designated automatically.

At block 310, the order request is transmitted to a transportation server (e.g., the transportation server 110). In some implementations, the order request is transmitted by the first client computing device. In other implementations, the order request is transmitted by the first NFC target device. In some implementations, a response is received from the transportation server indicating acceptance of the order request. The client computing device may then present for display a graphical representation of a relationship between a pick-up location and a location of the transportation vehicle, as well as other data related to the transportation vehicle (e.g., driver name, estimated time of arrival, vehicle make/model, etc.). Order flow may continue after block 310 using the client computing device, which is illustrated via graphical user interface (GUI) windows in FIGS. 6-9.

In some implementations, the order request is transmitted (e.g., by the order placement module 206 of the ordering component 200) to a vehicle computing devices (e.g., vehicle computing devices 150A-150Z) of one or more transportation vehicles. One of the transportation vehicles may accept the order request, and the accepting transportation vehicle may be designated as the transportation vehicle to pick up the user at the pick-up location.

In one implementation, the user may wish to transfer the order request to another user of a second client computing device (e.g., before the order has been placed, after the order has been placed, or after the order has been completed and the transportation vehicle has arrived). For example, the user may select an option in the transportation application that he/she wishes to transfer the order request to the other user (which may occur via near-field communication protocols or via the network 105), or the order request may be transferred automatically and without user input by bringing the first and second client computing devices within physical proximity (e.g., by "tapping" the two devices together). If the processing device detects that the first NFC device of the client computing device is in physical proximity of a second NFC device of the second client computing device, the processing device may cause the order request to be associated with (e.g., transferred to) the second client computing device. As a first example, if the order has not yet been placed, the order information may be transmitted from the first client computing device to the second client computing device, and the second client computing device may proceed with placing the order request. As a second example, if the order has been placed or completed, the first client computing device may receive information related to the second client computing device (e.g., a phone number, an identifier of the client computing device, a name of the user, etc.) and transmit this information to the transportation server. The transportation server may, in turn, update the order request to be associated with the second client computing device.

In some implementations, after the user has boarded the transportation vehicle, the processing device may detect that first NFC device of the first client computing device is in physical proximity of a second NFC target device of the transportation vehicle. For example, the user may place the first NFC device near a second NFC target device in order to facilitate payment for the transportation service. The payment information may then be transmitted to the second NFC target device.

Reference is now made to FIGS. 6-9, which illustrate exemplary GUI windows presented for display by an exemplary transportation application. FIG. 6A illustrates an exemplary GUI window 600 of a transportation application according to an implementation of the disclosure. In some implementations, the GUI window 600 and similar GUI windows described herein are implemented by a user interface (e.g., user interface 122A) of a client computing device (e.g., client computing device 120A) as an executed transportation application (e.g., which may be initiated in response to placing the client computing device in close proximity with an NFC target device, such as NFC target device 140A).

Figure 6A:
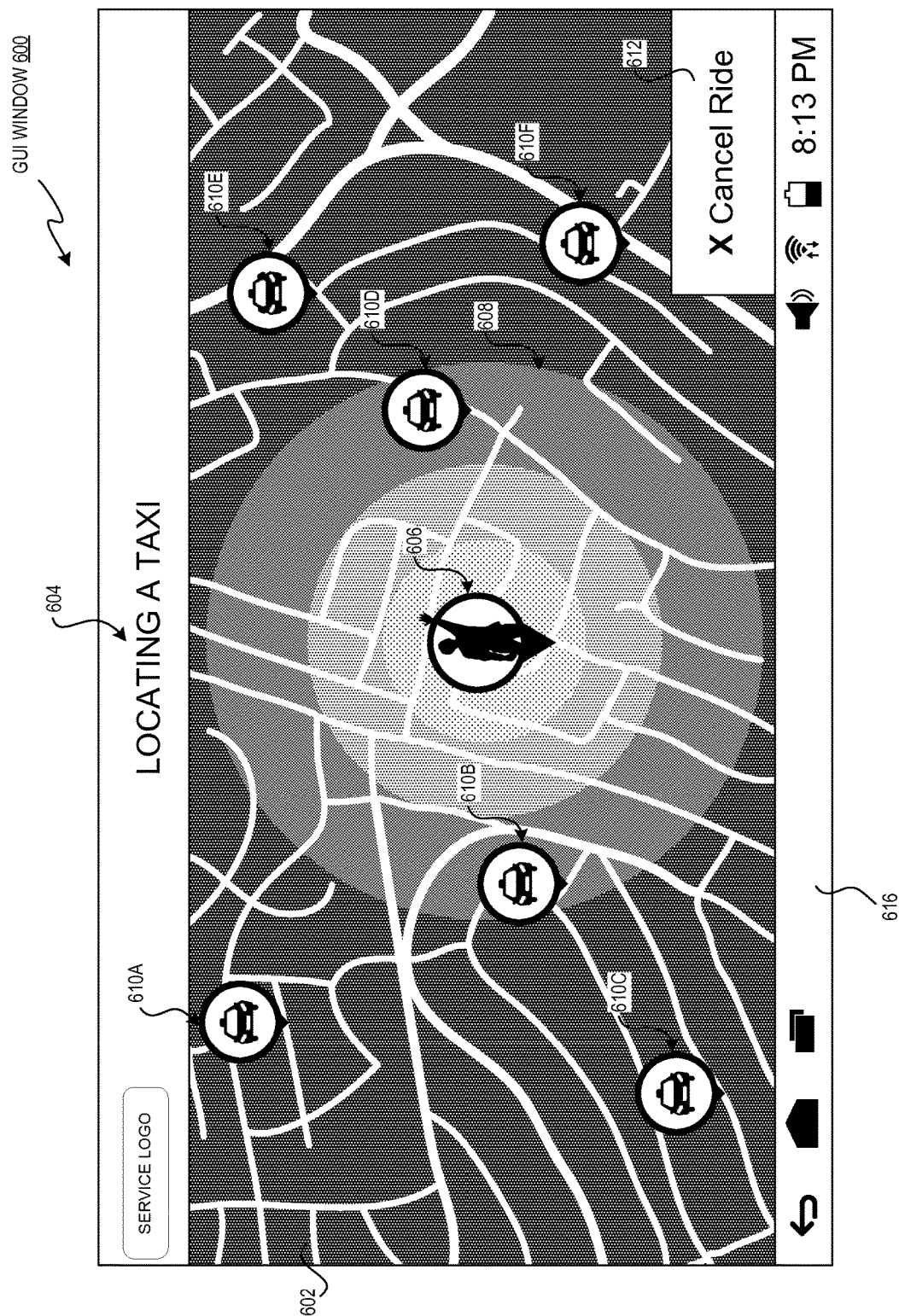
FIG. 6A illustrates an exemplary graphical user interface window for providing vehicle location information to a user according to an implementation of the disclosure.

As illustrated in FIG. 6A, a GUI window 600 may be presented for display by the client computing device (e.g., a transportation application executed by the client computing device), which includes a map region 602 to provide a map of the geographical area around the NFC target device. The GUI window 600 may also include a header region 604 that may display order-related messages or an address or location of the client computing device or the NFC targeting device detected by the client computing device. The map region 602 depicts a user location indicator 606 corresponding to a location of the user (e.g., of the client computing device), the NFC target device, or a suitable pick-up location near the user or NFC target device. The map region 602 also depicts vehicle location indicators 610A-610F which corresponds to current locations of transportation vehicles in the surrounding geographical area. In some implementations, if the GUI window 600 is implemented on a client computing device, such as a mobile device, a device options menu 616 may be included. In other implementations, such as if the GUI window 600 is implemented on a different device (a device other than a mobile device), the device options menu 616 is omitted.

In some implementations, vehicle information (e.g., driver name, vehicle type, etc.) is displayed adjacent to or as part of vehicle location indicators 610A-610F. In some implementations, the GUI window 600 may display location related information that is received from the transportation server (e.g., the tracking module 204 of the ordering component 200). In some implementations, the GUI window 600 includes a cancel option 612 that allows the user to cancel the order request.

In some implementations, the map region 602 also includes a radar indicator 608 that corresponds to a pre-defined range of the search for transportation vehicles. In some implementations, the order placement module 206 transmits the order request to vehicle computing devices of transportation vehicles within the pre-defined range (e.g., vehicles depicted by vehicle location indicators 610B and 610D). In some implementations, the order placement module 206 transmits the order request to all transportation vehicles associated with a geographical area or location. As an illustrative example, one or more transportation vehicles may specifically service a mall. The mall may have designated pick-up spots (e.g., at specific entrances of the mall), and may have NFC target devices located throughout the mall that may be detectable by client computing devices (e.g., client computing devices having built-in NFC initiating devices or client computing devices communicatively coupled NFC initiating devices).

In some implementations, the user may select one or more transportation vehicles manually (e.g., by touching, clicking, or otherwise indicating selection of) one or more of vehicle location indicators 610A-610F on the client computing device, which may result in the order placement module 206 transmitting the order request to the one or more selected transportation vehicles. In another implementation, the user may select one or more transportation vehicles from a list of transportation vehicles that includes relevant information for each of the transportation vehicles. In some implementations, the GUI window 600 also includes a search progress indicator (e.g., a bar or pie graph in the GUI window 600) that provides information about the progress of the search for a transportation vehicle (e.g., the bar grows as more transportation vehicles are located).

In one implementation, the tracking module 204 may determine estimated times of arrival for each of the transportation vehicles to which the order request was transmitted. The transportation vehicle with the fastest estimated time of arrival may be assigned as the transportation vehicle that is to pick up the user. In one implementation, the ordering component 200 (e.g., using the messaging module 208) transmits a message to the vehicle computing device of the assigned transportation vehicle indicating to the driver that he/she is to pick up the user at a designated pick-up location. In some implementations, pick-up location data is automatically imported into a GPS device located on-board the transportation vehicle.

In some implementations, one or more responses received from vehicle computing devices may indicate that one or more drivers have declined the order request. In some implementations, if the order request is not accepted within a pre-determined time duration (e.g., 30 seconds, 1 minute, 5 minutes, etc.), a message may be transmitted (e.g., by the messaging module 208) to the client computing device of the user indicating that the search for a transportation vehicle has failed.

Figure 6B:
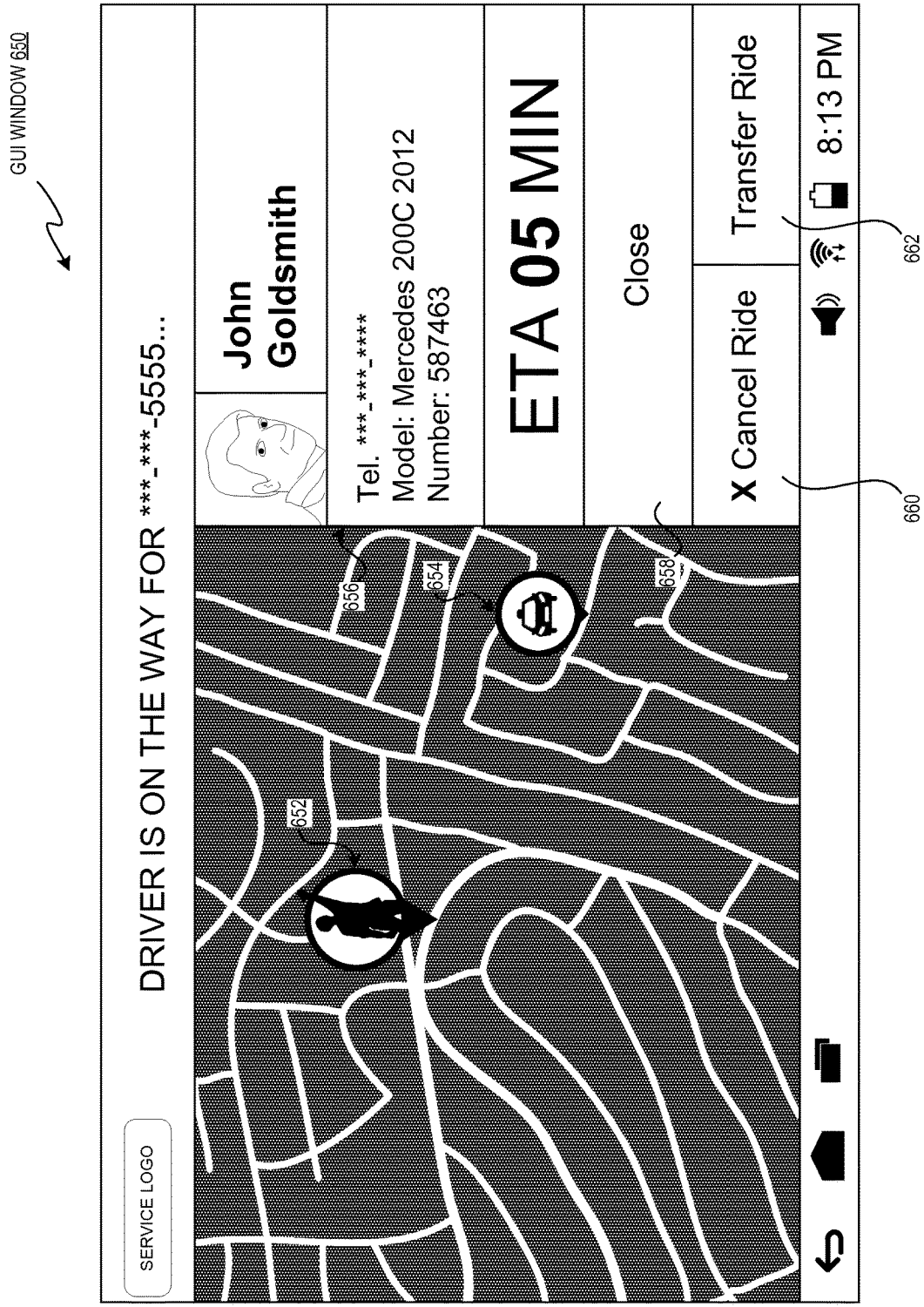
FIG. 6B illustrates another exemplary graphical user interface window for providing vehicle location information to a user according to an implementation of the disclosure.

As illustrated in FIG. 6B, a GUI window 650 indicates that a transportation vehicle has been assigned to pick up the user. The GUI window 650 displays a map along with a user location indicator 652 and a vehicle location indicator 654 corresponding to the assigned transportation vehicle. In some implementations, the map is updated in real-time to illustrate the transportation vehicle approaching the destination. The GUI window 650 also displays driver information 656, which may include the driver's name, telephone number, vehicle model, driver/vehicle number, etc., as well as an estimated time of arrival. The GUI also allows the user to cancel his/her request for a vehicle.

Figure 7A:
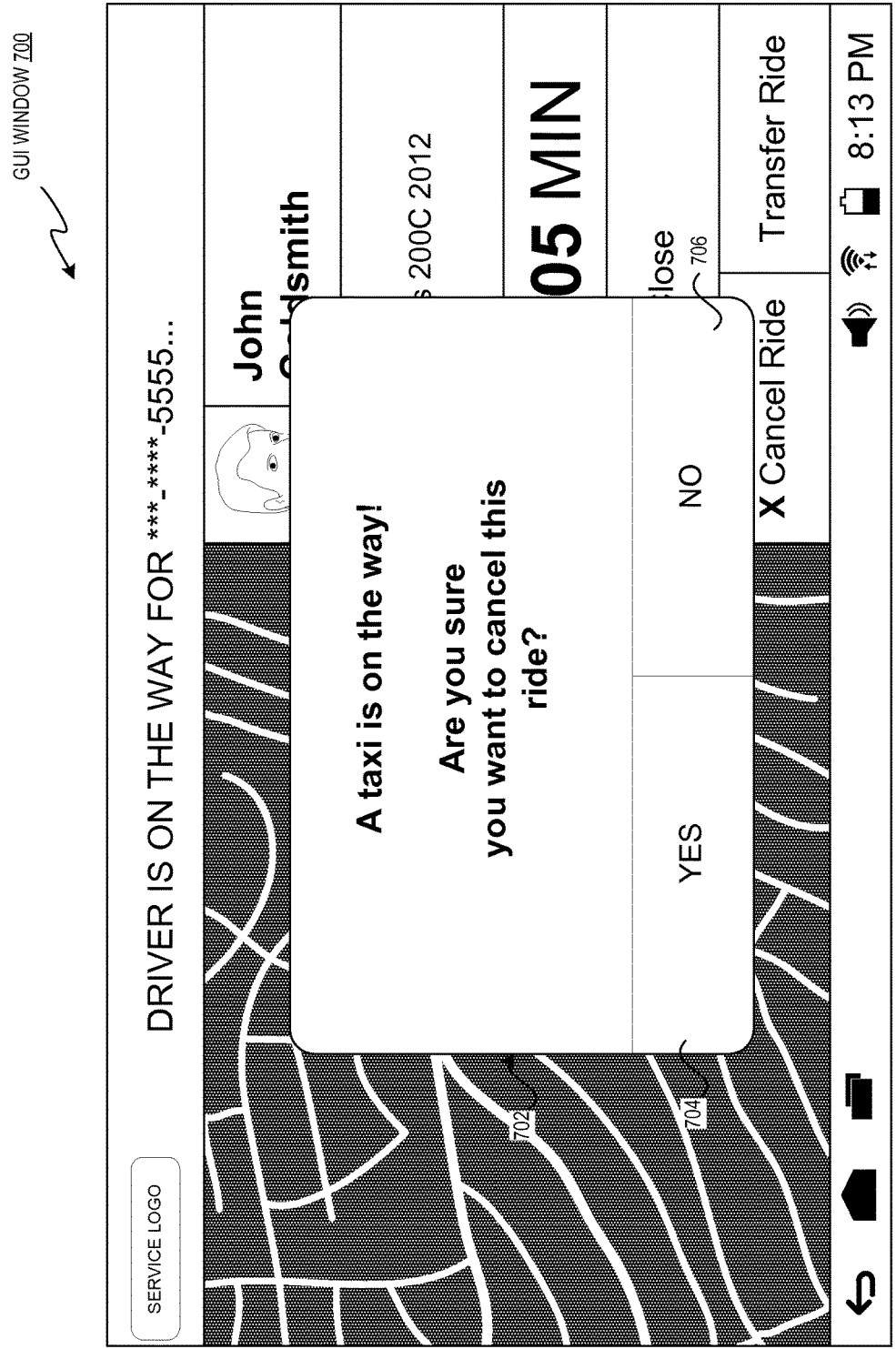
FIG. 7A illustrates an exemplary graphical user interface window for cancelling an order request according to an implementation of the disclosure.

In one implementation, the GUI window 650 includes a close button 658 that may cause the GUI window 650 to return to a default screen. In one implementation, the GUI window 650 includes a cancel button 660, which may allow the user to cancel the order request. For example, in response to a user selection of the cancel button 660, a GUI window 700 (as illustrated in FIG. 7A) may be presented which includes a cancellation menu 702. The user may cancel the order by selecting a button 704, or may maintain the order request by selecting a button 706.

Figure 7B:
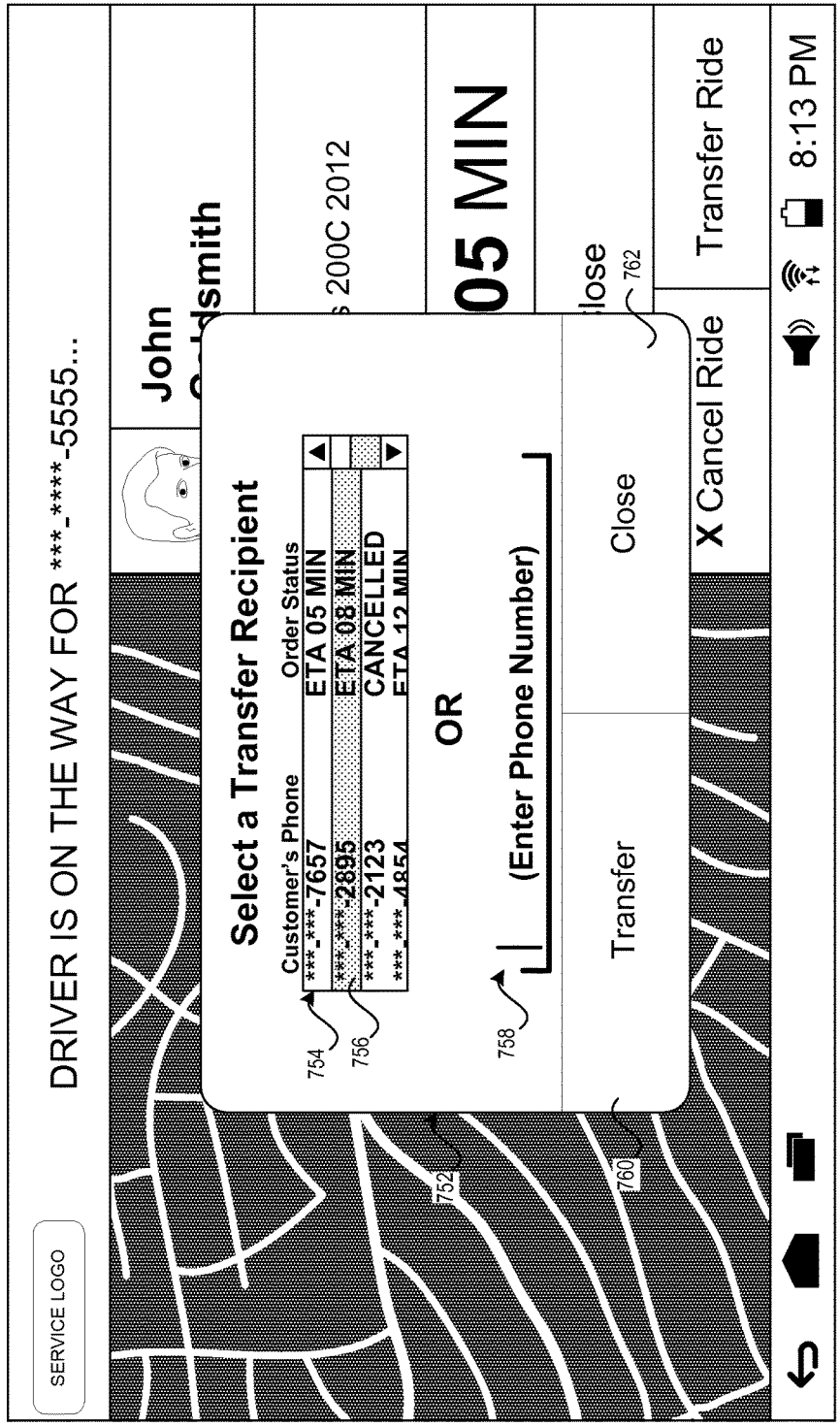
FIG. 7B illustrates an exemplary graphical user interface window for transferring an order request according to an implementation of the disclosure.

In one implementation, the GUI window 650 includes a transfer button 662, which may allow the user to transfer his/her current order request to another user. For example, if the user decides that he/she does not need a taxi, he/she may transfer the taxi to another person, such as the next person in line, a friend, or a person having a pre-existing order. In response to a selection of the transfer button 662, a GUI window 750 (as illustrated in FIG. 7B) may be presented which includes a transfer menu 752. The transfer menu 752 may include a list 754 of orders previously placed using the NFC target device. For example, the user may select an order listing 756 and transfer his/her current order to a user that placed the order indicated by the order listing 756 (e.g., in response to selecting a transfer button 760), and the order indicated by the order listing 756 may be cancelled. In one implementation, the user may enter a phone number of a transfer recipient in a text field 758, and transfer the current order to the transfer recipient by selecting the transfer button 760. In some implementations, the user may transfer the current order to the transfer recipient by placing the client computing device of the user in physical proximity of a client computing device of the recipient. In response to a selection of a close button 762, the GUI window 750 may revert back to the GUI window 700.

Figure 8A:
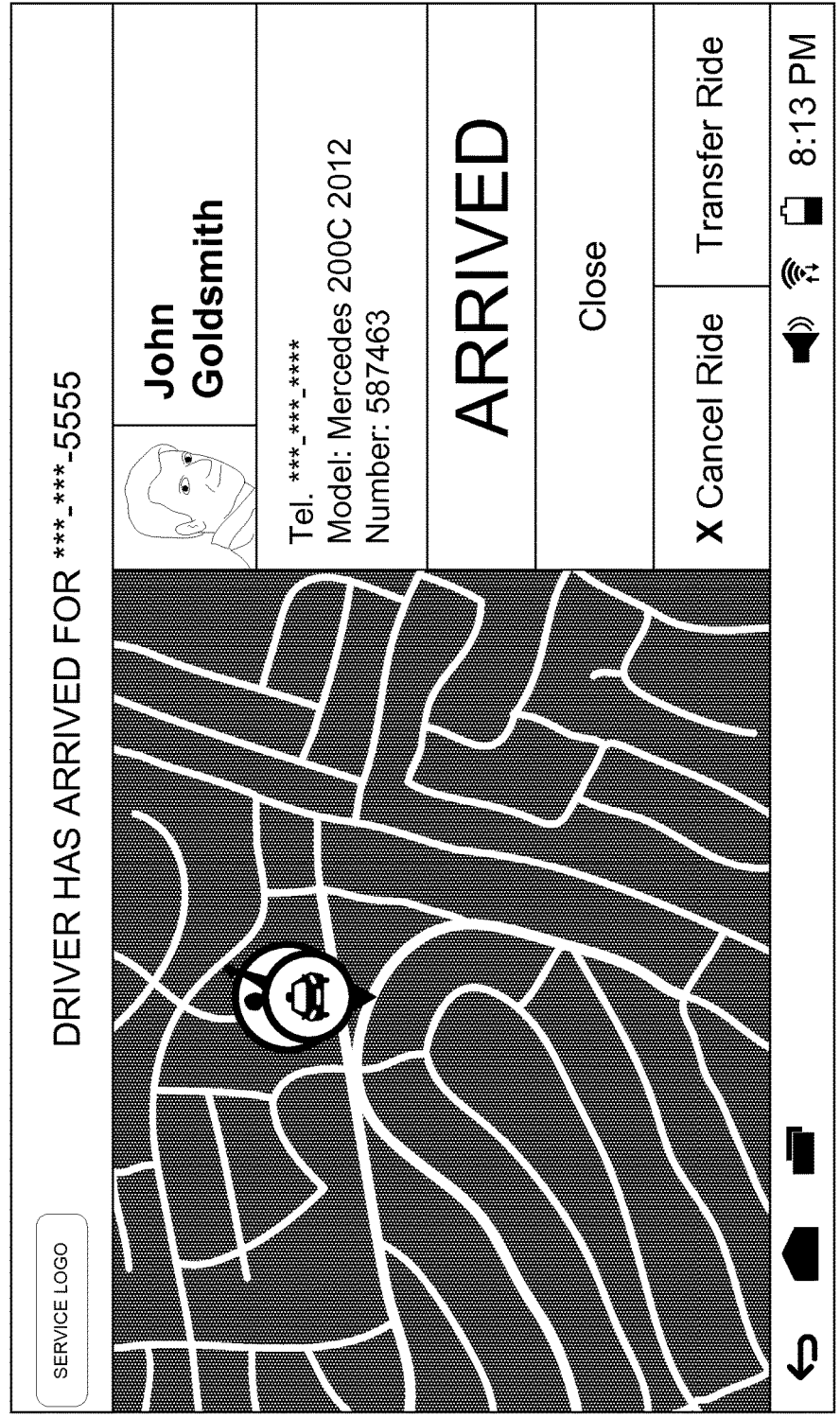
FIG. 8A illustrates an exemplary graphical user interface window for providing an order request update according to an implementation of the disclosure.

In one implementation, the tracking module 204 may determine that a transportation vehicle has arrived at the pick-up location. For example, based on received pick-up location data and vehicle location data, the tracking module 204 may determine that the transportation vehicle is within a pre-defined range of the pick-up location (e.g., within 10 feet, within 20 feet, etc.). As illustrated in FIG. 8A, a GUI window 800 may indicate to the user when the driver assigned to pick up the user has arrived.

Figure 8B:
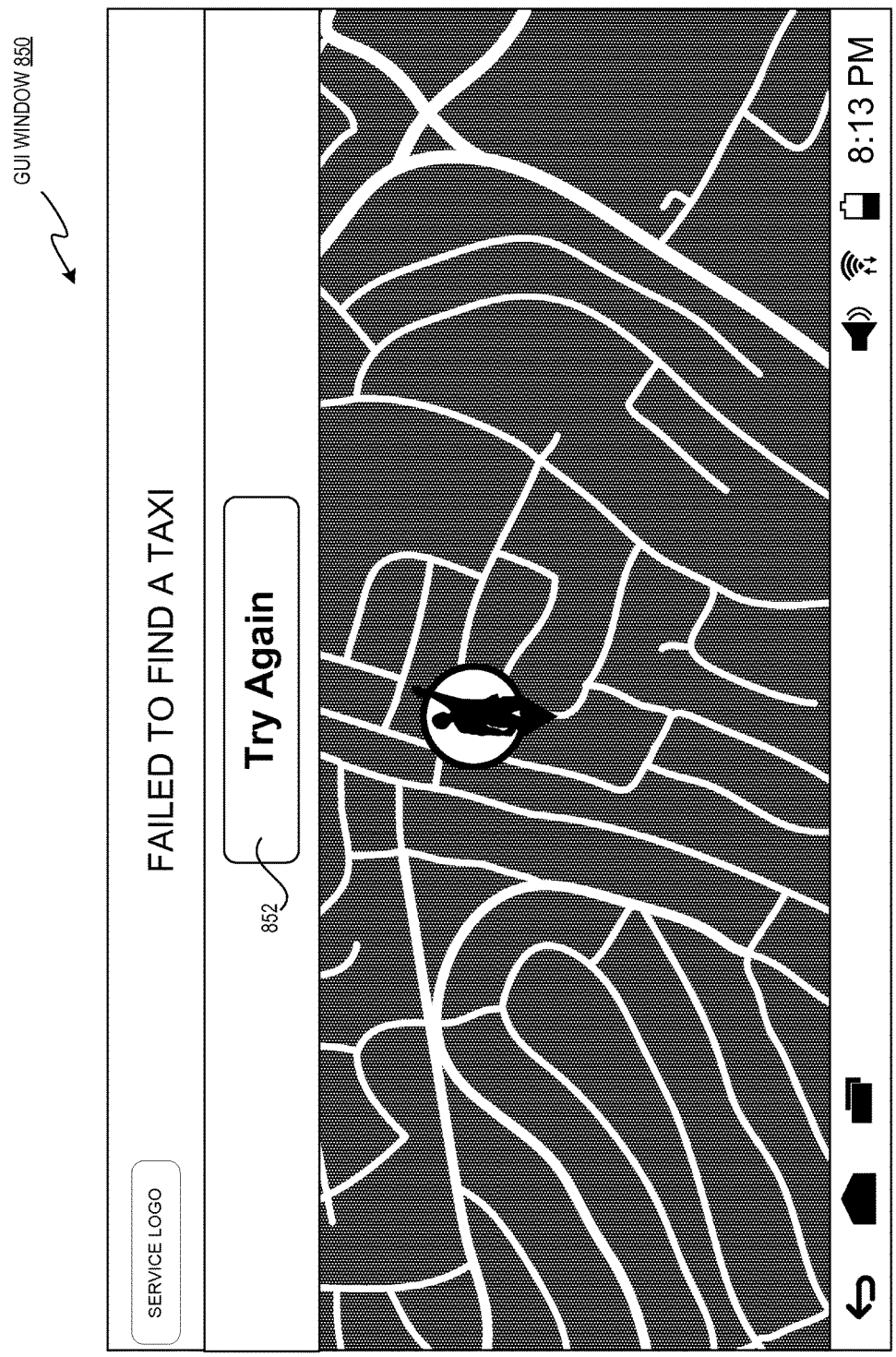
FIG. 8B illustrates an exemplary graphical user interface window for indicating a failed order request according to an implementation of the disclosure.

In one implementation, as illustrated in FIG. 8B, a GUI window 850 may be presented in the event that no transportation vehicle was located for the user and/or the driver en route to the pick-up location is unable to pick up the user. The GUI window 850 may be presented for display by a user device executing the transportation application. In some implementations, the GUI window 850 is presented for display if there are no transportation vehicles within a threshold range of the location of the NFC target device or a selected pick-up location.

In some implementations, the client computing device may automatically present a default GUI window when there is no user interaction for a particular duration of time (e.g., 10 seconds, 30 seconds, one minute, etc.). For example, after 5 seconds of inactivity, a timer appears with a countdown for 5 seconds before returning to the default GUI window. This timer feature may also be implemented by any of the GUI windows disclose herein.

Figure 9A:
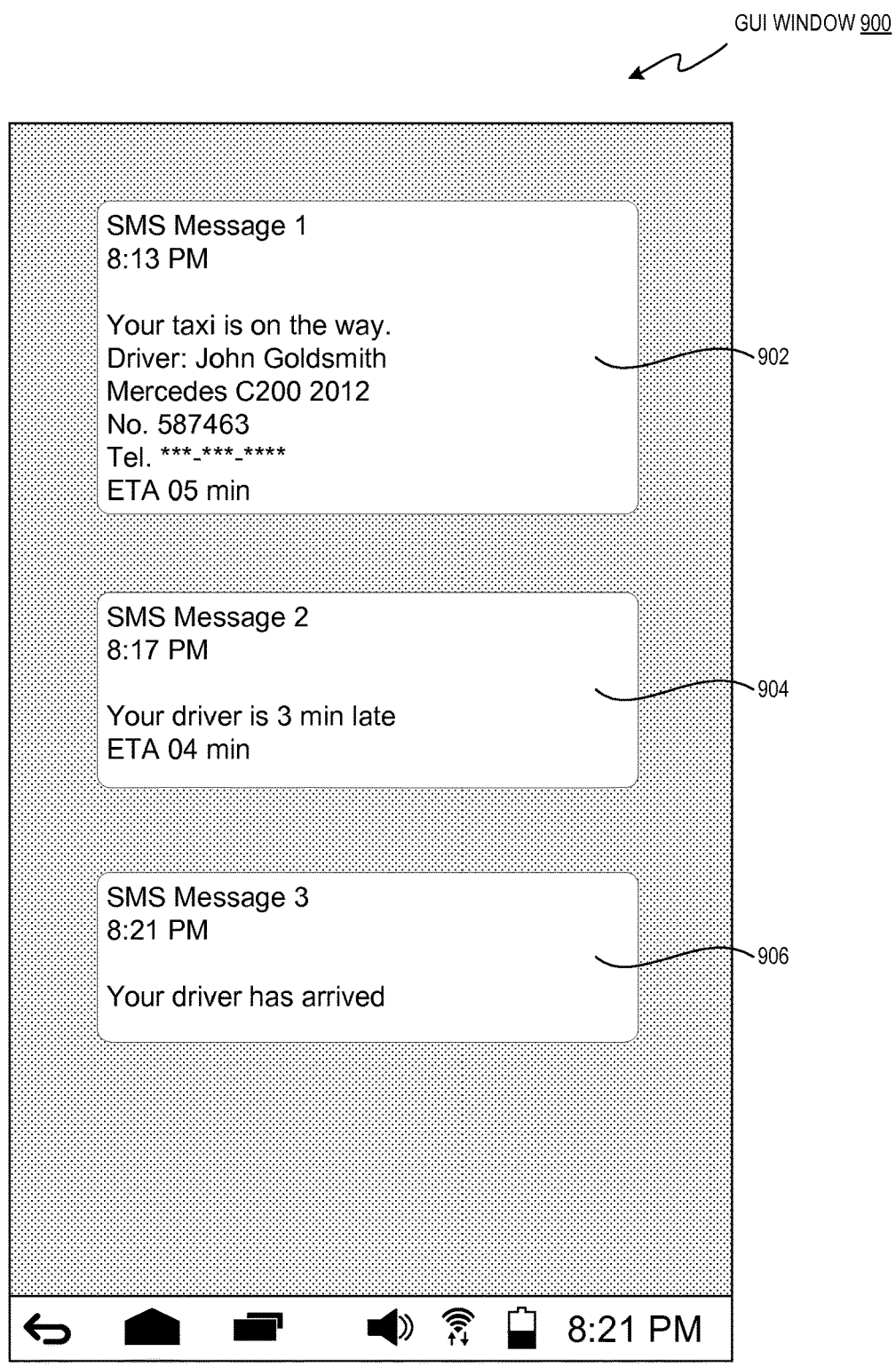
FIG. 9A illustrates an exemplary graphical user interface window showing order status messages received by a client computing device according to an implementation of the disclosure.

FIG. 9A illustrates example messages that may be transmitted by a server transportation server (e.g., the messaging module 208 of the transportation server 110) to a client computing device of a user during the ordering process. An exemplary GUI window 900 of the client computing device may display status messages 902, 904, and 906 at different times after an order has been placed and up to arrival of the transportation vehicle. In response, the transportation server may transmit one or more of an SMS message, an e-mail, a text messages, etc., to the client computing device to provide information about the transportation vehicle (e.g., estimated time of arrival for the transportation vehicle, driver name, vehicle make/model, etc.).

Figure 9B:
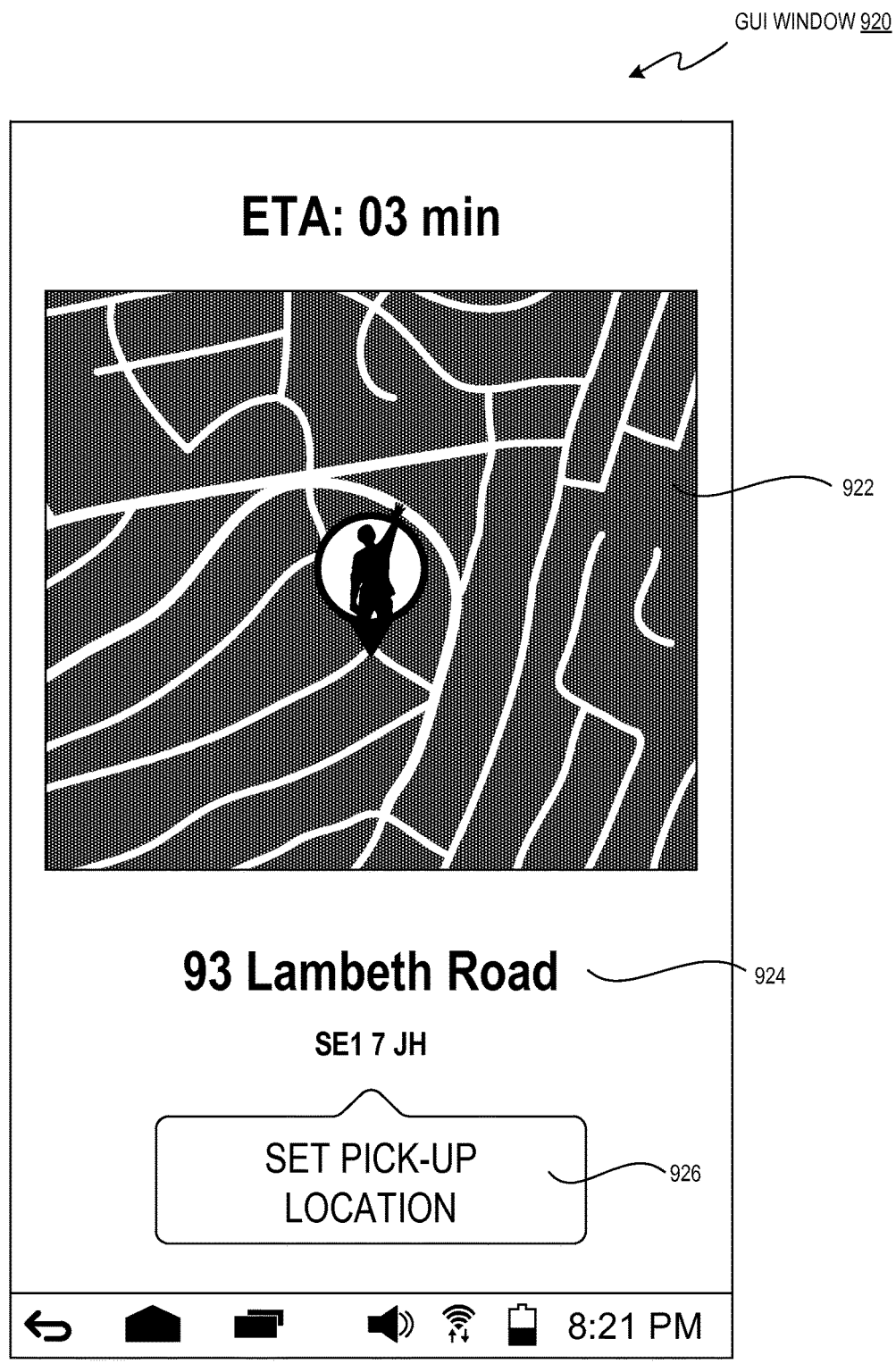
FIG. 9B illustrates an exemplary graphical user interface window for selecting a pick-up location according to an implementation of the disclosure.

FIG. 9B illustrates an exemplary GUI window 920 for setting a pick-up location according to an implementation of the disclosure. The GUI window 920 may be presented to the user by the transportation application. As discussed above, the client computing device may automatically initiate execution or resume execution of the transportation application in response to detecting an NFC target device. The transportation application may be provided with one or more pick-up locations by the NFC target device (e.g., the NFC target device may include location data such as a GPS location or an address of the NFC target device, and the client computing device may receive this location from the NFC target device). As illustrated in FIG. 9B, the transportation application may present a map 922 of the surrounding environment and a proposed pick-up location provided by the NFC target device (e.g., 93 Lambeth Road) as an option 924. The GUI window 920 allows the user to request pick-up at the proposed pickup location (e.g., in response to selection of pick-up location button 926). For example, the user may activate and/or select set pick-up location button 926 to request a transportation vehicle to pick up the user at the pickup location. In some implementations, other pick-up location options may be listed. The user may select one of these options and then select the set pick-up location button 926 to designate the selected option as the pick-up location. In some implementations, the user may directly input the pick-up location (e.g., an address, the name of an establishment, or GPS coordinates).

Figure 9C:
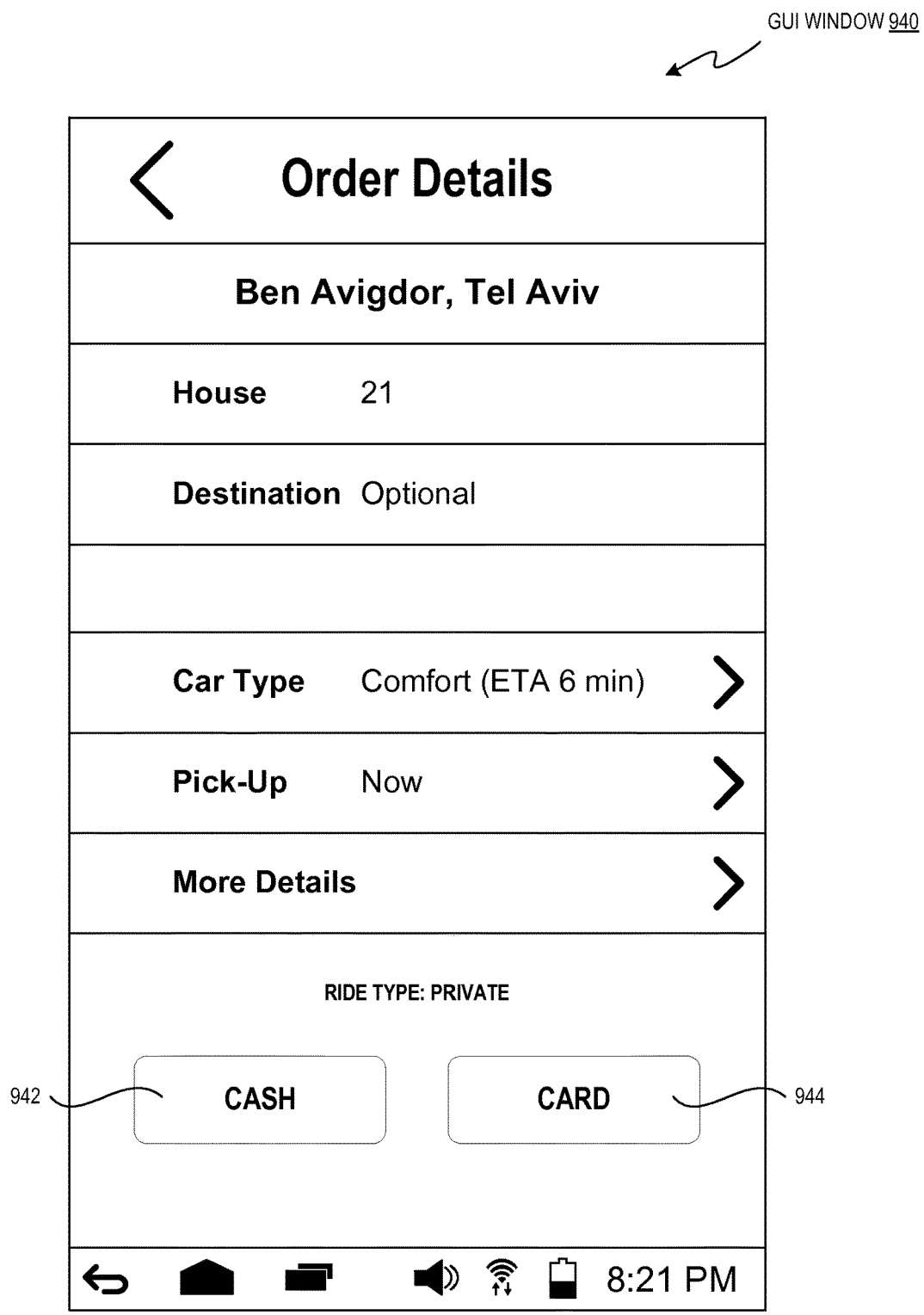
FIG. 9C illustrates an exemplary graphical user interface window for providing pick-up options in according to an implementation of the disclosure.

FIG. 9C illustrates an exemplary GUI window 940 for providing pick-up options in according to an implementation of the disclosure. The GUI window 940 may be presented to the user by the transportation application. As discussed above, the client computing device may automatically initiate execution or resume execution of the transportation application in response to detecting an NFC target device. As illustrated in FIG. 9C, the GUI window 940 may be presented to the user before placing an order request or after placing an order request (e.g., to edit the order request). The GUI window 940 allows the user to select options and/or parameters for the order or request. For example, the GUI window 940 allows the user to request a pick-up time (e.g., "Now" or "In One Hour", etc.), a type of the transportation vehicle, a destination of the vehicle, etc. Payment options 942, 944 allow a user to select whether he/she wishes to pay by cash or card (e.g., credit card), respectively.

Figure 9D:
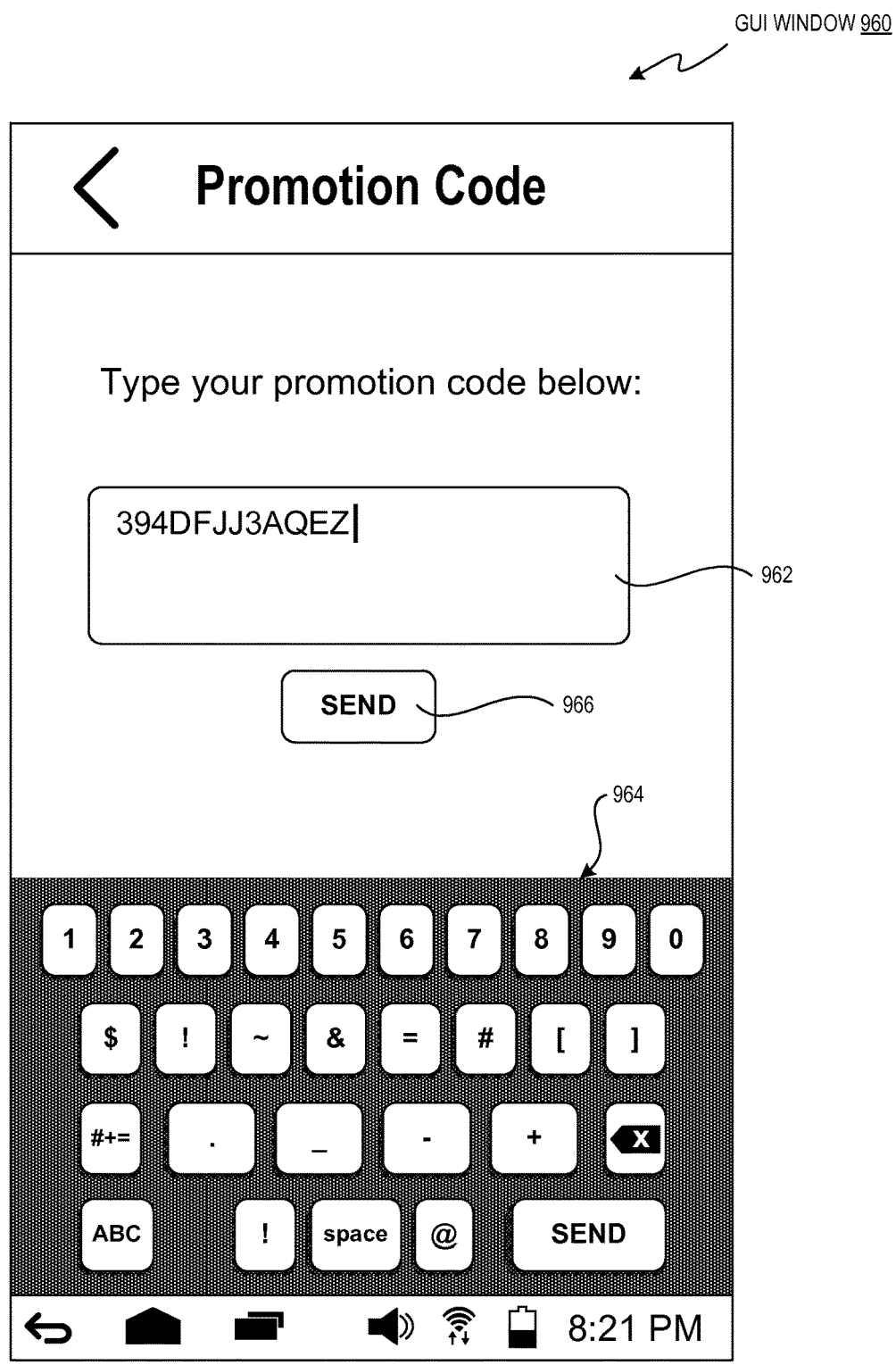
FIG. 9D illustrates an exemplary graphical user interface window for providing a promotion code according to an implementation of the disclosure.

FIG. 9D illustrates an exemplary GUI window 960 for providing a promotion code according to an implementation of the disclosure. As discussed above, the NFC target device may include data such as promotions and/or coupon codes. When the client computing device is placed in proximity to the NFC target device, the client computing device may receive the promotions and/or coupon codes from the NFC target device. As illustrated in FIG. 9D, the GUI window 960 may be presented to the user by the transportation application. The transportation application may allow the user to enter a code in an input field 962 using keypad 964 to receive a discount on goods and/or services. In some implementations, the input field 962 may be automatically populated (e.g., filled in) with the code when the user places the client computing device in physical proximity of the NFC target device. The user may send the code by selecting send option 966. This allows the user to obtain discounts and/or coupon codes without having to enter the codes manually.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture, such as a computer-readable device or storage medium, to facilitate transporting and transferring such methods to computing devices. Accordingly, the term "article of manufacture", as used herein, is intended to include a computer program accessible from any computer-readable device or storage medium.

Figure 10:
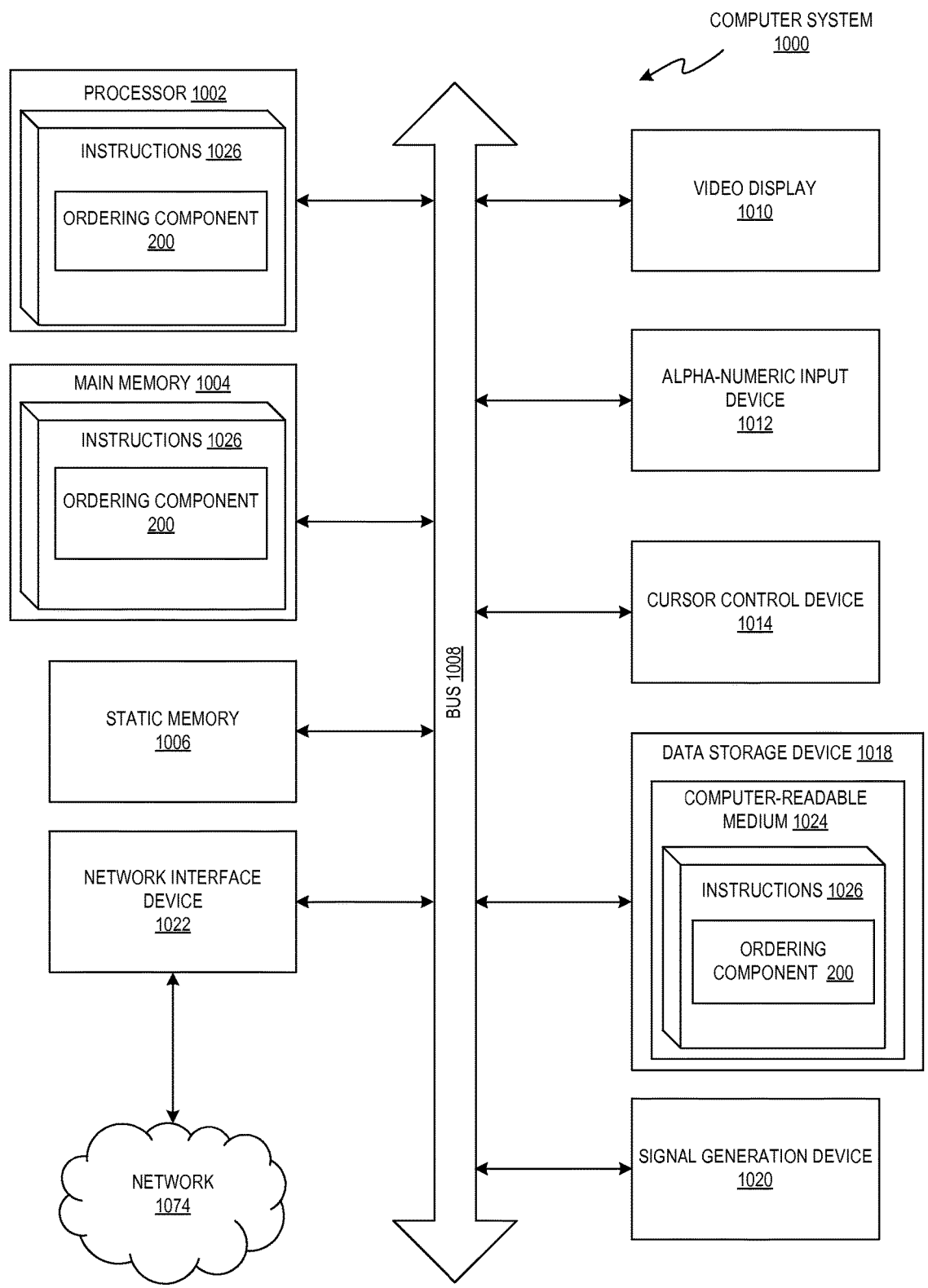
FIG. 10 is a block diagram illustrating an exemplary computer system for use in accordance an implementation of the disclosure.

FIG. 10 illustrates a diagrammatic representation of a machine in the exemplary form of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a PC, a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 1000 may be utilized by or illustrative of any of the transportation server 110, the client computing devices 120A-120Z, the data store 130, the NFC target devices 140A-140Z, the vehicle computing devices 150A-150Z, and the map data server 160.

The exemplary computer system 1000 includes a processing device (processor) 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1008.

Processor 1002 represents one or more general-purpose processing devices such as a microprocessor, central processing unit, or the like. More particularly, the processor 1002 may be a CISC microprocessor, a RISC microprocessor, a VLIW microprocessor, or a processor implementing other instruction sets or processors implementing a combination of instruction sets. The processor 1002 may also be one or more special-purpose processing devices such as an ASIC, an FPGA, a DSP, a network processor, or the like. The processor 1002 is configured to execute instructions 1026 for performing the operations and steps discussed herein.

The computer system 1000 may further include a network interface device 1022. The computer system 1000 also may include a video display unit 1010 (e.g., a liquid crystal display (LCD), a cathode ray tube (CRT), or a touch screen), an alphanumeric input device 1012 (e.g., a keyboard), a cursor control device 1014 (e.g., a mouse), and a signal generation device 1020 (e.g., a speaker). In some implementations, the signal generation device 1020 may include a vibrational actuator (e.g., for providing haptic feedback).

The data storage device 1018 may include a computer-readable storage medium 1024 on which is stored one or more sets of instructions 1026 (e.g., software) embodying any one or more of the methodologies or functions described herein. The instructions 1026 may also reside, completely or at least partially, within the main memory 1004 and/or within the processor 1002 during execution thereof by the computer system 1000, the main memory 1004 and the processor 1002 also constituting computer-readable storage media. The instructions 1026 may further be transmitted or received over a network 1074 (e.g., the network 105) via the network interface device 1022.

In one implementation, the instructions 1026 include instructions for one or more ordering components 200, which may correspond to the identically-named counterpart described with respect to FIGS. 1 and 2. While the computer-readable storage medium 1024 is shown in an exemplary implementation to be a single medium, the terms "computer-readable storage medium" or "machine-readable storage medium" should be taken to include a single medium or multiple media (e.g., a centralized or distributed database, and/or associated caches and servers) that store the one or more sets of instructions. The terms "computer-readable storage medium" or "machine-readable storage medium" shall also be taken to include any transitory or non-transitory medium that is capable of storing, encoding or carrying a set of instructions for execution by the machine and that cause the machine to perform any one or more of the methodologies of the present disclosure. The terms "computer-readable storage medium" or "machine-readable storage medium" shall accordingly be taken to include, but not be limited to, solid-state memories, optical media, and magnetic media.

The above description sets forth numerous specific details such as examples of specific systems, components, methods and so forth, in order to provide a thorough understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

Some portions of the detailed description may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "sending", "receiving", "transmitting", "detecting", "forwarding", "caching", "causing", "providing", "generating", "adding", "subtracting", "removing", "estimating", "analyzing", "determining", "enabling", "identifying", "modifying" or the like, refer to the actions and processes of a computer system, or similar electronic computing device, that manipulate and transform data represented as physical (e.g., electronic) quantities within the computer system's registers and memories into other data similarly represented as physical quantities within the computer system memories or registers or other such information storage, transmission or display devices.

The disclosure also relates to an apparatus, device, or system for performing the operations herein. This apparatus, device, or system may be specially constructed for the required purposes, or it may include a general purpose computer selectively activated or reconfigured by a computer program stored in the computer. Such a computer program may be stored in a computer- or machine-readable storage medium, such as, but not limited to, any type of disk including floppy disks, optical disks, compact disk read-only memories (CD-ROMs), and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an implementation" or "one implementation" means that a particular feature, structure, or characteristic described in connection with the implementation is included in at least one implementation. Thus, the appearances of the phrase "an implementation" or "one implementation" in various places throughout this specification are not necessarily all referring to the same implementation. Moreover, it is noted that the "A-Z" notation used in reference to certain elements of the drawings is not intended to be limiting to a particular number of elements. Thus, "A-Z" is to be construed as having one or more of the element present in a particular implementation. It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    detecting, by a processing device of a first client computing device, that a first near-field communication (NFC) device of the first client computing device is in physical proximity of a first NFC target device;
    in response to the detecting, initiating, by the processing device, execution of a transportation vehicle request application by the processing device of the first client computing device, wherein initiating the execution of the transportation vehicle request application comprises presenting, on the first client computing device, a graphical user interface associated with the transportation vehicle request application;
    receiving, by the processing device, data from the first NFC target device;
    generating, by the processing device, an order request for a transportation vehicle using the transportation vehicle request application and the received data;
    transmitting, by the processing device, the order request to a transportation server;
    receiving, by the processing device, a response from the transportation server indicating acceptance of the order request;
    causing, by the processing device, the first client computing device to display, using the graphical user interface, a graphical representation of a relationship between a pick-up location and a location of the transportation vehicle;
    in response to detecting that the first NFC device of the first client computing device is in a predetermined physical proximity of a second NFC device of a second client computing device, determining whether the order request has been placed; and
    in response to determining that the order request has not been placed, causing, by the processing device, the order request to be associated with the second client computing device by transmitting information about the order request from the first client computing device to the second client computing device.

2. The method of claim 1, further comprising:
    in response to determining that the order request has been placed, causing, by the processing device, the order request to be associated with the second client computing device by transmitting information related to the second client computing device to the transportation server.

3. The method of claim 1, wherein detecting the first NFC target comprises detecting that the first NFC target device is within one foot of the first NFC device.

4. The method of claim 1, wherein the first NFC target device is a passive radio-frequency (RF) device that is capable of being powered by an RF transceiver of the first NFC device, and wherein receiving data from the first NFC target device comprises receiving data from the first NFC target device in response to powering the first NFC target with the RF transceiver.

5. The method of claim 1, wherein the data comprises one or more of location data, the transportation vehicle request application, or coupon data.

6. The method of claim 1, further comprising:
    detecting, by the processing device, that the first NFC device of the first client computing device is in physical proximity of a second NFC target device of a transportation vehicle; and
    transmitting, by the processing device, payment information to the second NFC target device.

7. A system comprising:
    a first NFC device;
    a memory; and
    a processing device communicatively coupled to the memory, wherein the processing device is to:
        detect that the first NFC device is in physical proximity of a first NFC target device;
        initiate execution of a transportation vehicle request application by the processing device in response to detecting that the first NFC device is in physical proximity of the first NFC target device, wherein to initiate the execution of the transportation vehicle request application, the processing device is further to present, on a first client computing device, a graphical user interface;

receive data from the first NFC target device;

generate an order request for a transportation vehicle using the transportation vehicle request application and the received data;

transmit the order request to a transportation server;

receive a response from the transportation server indicating acceptance of the order request;

cause the graphical user interface to display a graphical representation of a relationship between a pick-up location and a location of the transportation vehicle;

in response to detecting that the first NFC device of the first client computing device is in a predetermined physical proximity of a second NFC device of a second client computing device, determine whether the order request has been placed; and in response to determining that the order request has not been placed, cause the order request to be associated with the second client computing device by transmitting information about the order request from the first client computing device to the second client computing device.

8. The system of claim 7, wherein the processing device is further to: in response to determining that the order request has been placed, cause the order request to be associated with the second client computing device by transmitting information related to the second client computing device to the transportation server.

9. The system of claim 7, wherein detecting the first NFC target comprises detecting that the first NFC target device is within one foot of the first NFC device.

10. The system of claim 7, wherein the first NFC target device is a passive radio-frequency (RF) device that is capable of being powered by an RF transceiver of the first NFC device, and wherein receiving data from the first NFC target device comprises receiving data from the first NFC target in response to powering the first NFC target device with the RF transceiver.

11. The system of claim 7, wherein the data comprises one or more of location data, the transportation vehicle request application, or coupon data.

12. The system of claim 7, wherein the processing device is further to:

detect that the first NFC device is in physical proximity of a second NFC target device of a transportation vehicle; and transmit payment information to the second NFC target device.

13. A non-transitory computer-readable storage medium having instructions encoded thereon which, when executed by a processing device of a first client computing device, cause the processing device to perform operations comprising:

detecting that a first NFC device of the first client computing device is in physical proximity of a first NFC target device;

in response to the detecting, initiating execution of a transportation vehicle request application by the processing device of the first client computing device, wherein initiating the execution of the transportation vehicle request application comprises presenting, on the first client computing device, a graphical user interface associated with the transportation vehicle request application;

receiving data from the first NFC target device;

generating an order request for a transportation vehicle using the transportation vehicle request application and the received data;

transmitting the order request to a transportation server;

receiving a response from the transportation server indicating acceptance of the order request;

causing the first client computing device to display, using the graphical user interface, a graphical representation of a relationship between a pick-up location and a location of the transportation vehicle;

in response to detecting that the first NFC device of the first client computing device is in a predetermined physical proximity of a second NFC device of a second client computing device, determining whether the order request has been placed; and in response to determining that the order request has not been placed, causing the order request to be associated with the second client computing device by transmitting information about the order request from the first client computing device to the second client computing device.

14. The non-transitory computer-readable storage medium of claim 13, wherein the operations further comprise: in response to determining that the order request has been placed, causing the order request to be associated with the second client computing device by transmitting information related to the second client computing device to the transportation server.

15. The non-transitory computer-readable storage medium of claim 13, wherein the operations further comprise:

detecting that the first NFC device of the first client computing device is in physical proximity of a second NFC target device of a transportation vehicle; and transmitting payment information to the second NFC target device.

* * * * *